United States Patent
Venkataraman et al.

(10) Patent No.: US 11,232,042 B2
(45) Date of Patent: Jan. 25, 2022

(54) PROCESS DEDICATED IN-MEMORY TRANSLATION LOOKASIDE BUFFERS (TLBS) (MTLBS) FOR AUGMENTING MEMORY MANAGEMENT UNIT (MMU) TLB FOR TRANSLATING VIRTUAL ADDRESSES (VAS) TO PHYSICAL ADDRESSES (PAS) IN A PROCESSOR-BASED SYSTEM

(71) Applicant: Microsoft Technology Licensing, LLC, Redmond, WA (US)

(72) Inventors: Madhavan Thirukkurungudi Venkataraman, Plano, TX (US); Thomas Philip Speier, Wake Forest, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 16/685,320

(22) Filed: Nov. 15, 2019

(65) Prior Publication Data
US 2021/0149818 A1 May 20, 2021

(51) Int. Cl.
*G06F 12/1027* (2016.01)

(52) U.S. Cl.
CPC .... *G06F 12/1027* (2013.01); *G06F 2212/651* (2013.01); *G06F 2212/681* (2013.01); *G06F 2212/683* (2013.01)

(58) Field of Classification Search
CPC ............... G06F 2212/681; G06F 2212/651
See application file for complete search history.

(56) References Cited

U.S. PATENT DOCUMENTS

| 4,774,653 A * | 9/1988 | James | G06F 12/1027 |
| | | | 711/207 |
| 7,111,145 B1 | 9/2006 | Chen et al. | |
| 9,639,476 B2 | 5/2017 | Chin et al. | |
| 2006/0224815 A1 | 10/2006 | Yamada et al. | |

(Continued)

FOREIGN PATENT DOCUMENTS

WO  2019210019 A1  10/2019

OTHER PUBLICATIONS

"International Search Report and Written Opinion Issued in PCT Application No. PCT/US20/057585", dated Mar. 1, 2021, 10 Pages.

*Primary Examiner* — Chie Yew

(74) *Attorney, Agent, or Firm* — Withrow & Terranova, PLLC

(57) ABSTRACT

Process dedicated in-memory translation lookaside buffers (TLBs) (mTLBs) for augmenting a memory management unit (MMU) TLB for translating virtual addresses (VAs) to physical addresses (PA) in a processor-based system is disclosed. In disclosed examples, a dedicated in-memory TLB is supported in system memory for each process so that one process's cached page table entries do not displace another process's cached page table entries. When a process is scheduled to execute in a central processing unit (CPU), the in-memory TLB address stored for such process can be used by page table walker circuit in the CPU MMU to access the dedicated in-memory TLB for executing the process to perform VA to PA translations in the event of a TLB miss to the MMU TLB. If a TLB miss occurs to the in-memory TLB, the page table walker circuit can walk the page table in the MMU.

28 Claims, 9 Drawing Sheets

(56) References Cited

U.S. PATENT DOCUMENTS

| | | | | |
|---|---|---|---|---|
| 2009/0327646 A1* | 12/2009 | Jordan | ................ | G06F 12/1036 |
| | | | | 711/207 |
| 2013/0326143 A1* | 12/2013 | Chen | ................... | G06F 12/1009 |
| | | | | 711/122 |
| 2014/0281363 A1* | 9/2014 | Tian | ........................ | G06F 12/10 |
| | | | | 711/207 |
| 2018/0107604 A1* | 4/2018 | Dooley | ............... | G06F 12/0802 |

* cited by examiner

PROCESS DEDICATED IN-MEMORY TRANSLATION LOOKASIDE BUFFERS (TLBS) (MTLBS) FOR AUGMENTING MEMORY MANAGEMENT UNIT (MMU) TLB FOR TRANSLATING VIRTUAL ADDRESSES (VAS) TO PHYSICAL ADDRESSES (PAS) IN A PROCESSOR-BASED SYSTEM

FIELD OF THE DISCLOSURE

The technology of the disclosure relates to processor-based systems employing a central processing unit (CPU), also known as a "processor," and more particularly to a memory management unit (MMU) in a processor that includes a translation lookaside buffer (TLB) and page tables accessed to provide virtual address (VA) to physical address (PA) translations.

BACKGROUND

Microprocessors, also known as "processors," perform computational tasks for a wide variety of applications. A conventional microprocessor includes one or more central processing units (CPUs) also known as processor cores. The processor is realized in a processor-based system that includes a memory system that is accessed to retrieve computer instructions that are executed by the processor to perform tasks. The memory system is also accessed to retrieve data that is used for execution of computer instructions. Results of the executed computer instructions can be stored as data in the memory system. The memory system includes a primary or system memory that is located on-chip or off-chip with the processor and is configured to retrieve and store data associated with a physical memory address also known as a physical address (PA) provided by the processor. The memory system may also include a cache memory system that includes one or more levels of cache memory that is faster memory than the system memory and is configured to store data for a subset of the PAs for data that is more often accessed by the processor for improved memory access performance.

Operating systems that execute processes on a processor may be configured to use virtual memory as a virtual memory system. In virtual memory systems, each process is given the impression that a larger number of memory addresses are available for retrieving and storing data than PAs in the memory system. For example, each CPU in a processor may have larger VA space of 0x00000000-0x7FFFFFFF that must be mapped to a smaller PA space of 0x00000000-0x00FFFFFF in the memory system for a given process. When a process requests access to data in memory, the process provides a memory address that is a virtual address (VA) based on the larger PA space. The VA must be mapped to an actual PA in the memory system where the data is to be stored or retrieved. In this regard, each CPU in a processor may contain a memory management unit (MMU) that is employed to translate VAs to PAs. Most processor architectures support an in-memory table called a "page table" to map VAs to PAs. A page table is the data structure that contains one page table entry (PTE) per memory page to map a VA to a PA. Most page tables have multiple levels that depend upon the base page size, the number of page table entries at each level, and the number of bits of VA space supported. FIG. 1 illustrates an example of a multiple level page table 100 that includes three (3) levels of level page tables 102(2)-102(0) that is configured to be accessed to convert a VA 104 to a PA. The level page tables 102(2)-102(0) are organized to provide for a base page size of 4 Kilobytes (KB) where the number of PTEs at each page table level is 512 (i.e., addressable by 9 bits) with a 39 bit VA space supported. The top level (level 2) page table 102(2) is at level 2 and is indexed by a level 2 index in bits 38-30 of the VA 104. The page table entries (entry 0-entry 511) of the level 2 page table 102(2) point to one of an 'X' number of level 1 page tables 102(1)(0)-102(1)(X), which is then indexed by a level 1 index in bits 29-21 of the VA 104. The page table entries in the level 1 page table 102(1) points to one of 'Y' number of level 0 page tables 102(0)(0)-102(0)(Y), which is then indexed by a level 0 index in bits 20-12 of the VA 104. In this example, page table entries accessed across the level page tables 102(2)-102(0) in the page table 100 identify a PA of a 4 KB page in physical memory. The offset bits of PA for the VA 104 is the offset in the VA 104 in bits 11-0 in this example.

MMUs typically provide a hardware page table walker architecture to translate a VA to a PA. For a given VA, the page table walker walks the page table from the top and descends down the page table levels until it finds the leaf PTE that contains the PA for the VA. The page table walk involves memory references at each level of page table which can be time consuming. To address this page table walk inefficiency, MMUs typically include a high-speed cache memory called a translation lookaside buffer (TLB) to cache the most recent VA to PA translations. In response to a memory address request where a VA to PA translation is required, the MMU first accesses in the TLB based on the VA of memory access request. If the VA to PA translation is not present in the TLB, a TLB miss occurs and the MMU walks the page table until it finds the VA to PA translation which is also then loaded in the TLB for future accesses. If the VA to PA translation is present in the TLB, this is a TLB hit, and a page table walk of the page table is avoided. So, the hit rate to the TLB is a critical part of the memory access performance of a memory system in processor-based system.

When a workload is executed on a CPU, multiple processes and the operating system kernel compete for entries of the TLB in the MMU. A Least Recently Used (LRU) algorithm may be used by the MMU to evict older entries in the TLB as new entries are inserted in the TLB as a result of TLB misses and page table walks. As the stress of the workload on memory increases, the TLB can start to thrash, meaning TLB misses and resulting evictions and insertions occur frequently which degrades performance. At the MMU hardware level, there are two ways to address this issue. One solution is to increase the size of the TLB to make the TLB misses occur less frequently. A second solution is to provide a cache of intermediate page table pointers in the MMU. In this scenario, when a TLB miss occurs, the page table walker looks in this cache of intermediate page table pointers for a matching intermediate page table. On a cache hit, the page table walker starts the page table walk from the matching intermediate page table instead of from the top level page table to shorten the time to walk the page table. However, cost and complexity of the MMU hardware is increased by each of these solutions. Also, these solutions may only ultimately delay eventual TLB thrashing. This problem is also further exacerbated in virtual environments. When a guest virtual machine runs on a host computer, the guest virtual machine has its own page table that is used to translate guest VAs to guest PAs. The host computer also has its own page table that is used to translate guest PAs to host PAs. Since memory can only be accessed by a CPU using a host PA, every guest PA has to be translated by the CPU to its host PA. When a page table walker walks the guest page table, it needs to translate a guest PA to a host PA at every level of the guest page table in order to access the guest intermediate page table at that level. The translation overhead may be even greater for guests running on a nested hypervisor.

SUMMARY

Aspects disclosed herein include process dedicated in-memory translation lookaside buffers (TLBs) (mTLBs) for augmenting a memory management unit (MMU) TLB for translating virtual addresses (VAs) to physical addresses (PA) in a processor-based system. The processor-based system includes a processor that has one or more central processing units (CPUs) each configured to execute computer software instructions for processes. The processor-based system also includes a memory system that includes a main physical memory that is addressable by a PA. The processor is a virtual memory system that employs virtual addressing to make available memory to a memory space greater than the number of physical memory space in the main system memory of the processor-based system. In certain examples, either a shared or dedicated MMU for each CPU is provided for converting VAs to PAs. The MMUs are associated with a TLB (the "MMU TLB") and a page table (which is a memory circuit) in a system memory. The system memory is a memory that is fully addressable by the PA space of the processor-based system. The MMU TLB is a cache memory associated with a MMU and is configured to cache page table entries in the page table to avoid the need to fully walk the page table if a page table entry in the page table for the VA to PA translation is contained in the MMU TLB.

In exemplary aspects disclosed herein, to augment an MMU TLB to reduce either having to walk the page table or perform a full page table walk to translate a VA to a PA, the processor-based system also supports an in-memory TLB allocated in the system memory. In this regard, in response to an MMU TLB miss for a VA to a PA translation, an in-memory TLB is accessed to determine if a page table entry for the VA to PA translation is contained in the in-memory TLB. If a page table entry for the VA to PA translation is contained in the in-memory TLB, the page table entry in the in-memory TLB is used to perform the VA to PA translation. In this manner, additional page table entries can be cached for VA to PA translation without having to expand the size of an MMU TLB. The in-memory TLB can be sized to provide a higher hit rate if desired. If a page table entry for the VA to PA translation is not contained in the in-memory TLB, the MMU walks its page table to perform the VA to PA translation.

In examples disclosed herein, a, dedicated in-memory TLB is supported in system memory for each process in the processor and which are not shared across processes, so that one process's cached page table entries do not displace another process's cached page table entries. In this regard, each CPU in the processor supports storing of pointer addresses to the in-memory TLBs in system memory so that the MMUs in the CPUs can access the dedicated in-memory TLB corresponding to a particular process. A dedicated in-memory TLB may also be supported for an operating system kernel and/or a hypervisor that supervises virtualization of guest processes executing on a host CPU in examples disclosed herein. When a process is scheduled to execute in a CPU, the in-memory TLB address stored for such process can be loaded into loaded into a designated register in the CPU. This allows the page table walker circuit of the MMU to access the dedicated in-memory TLB for the executing process for performing VA to PA translations in the event of a TLB miss to the MMU TLB. If a TLB miss occurs to the in-memory TLB for an executing process, the page table walker circuit of the MMU can walk the page table. Supporting dedicated in-memory TLBs per process also allows allocation of different sized in-memory TLBs for different processes, if desired, to have different sized in-memory TLBs, which may be based on their memory access patterns and the number of process threads sharing an in-memory TLB as examples. In another example, the in-memory TLBs being in system memory is direct memory-mapped to memory addresses, which can also simplify the cached page table entry replacement policy.

In other examples, the in-memory TLBs can be configured to cache different levels of page table entries in a page table into an MMU TLB. In another example, the in-memory TLBs can be configured to cache only certain levels of level page tables in a page table into an MMU TLB. For example, in-memory TLBs associated with a given MMU can be configured to cache page table entries from a higher level page table than the page table entries cached in the MMU TLB for enhanced performance. Thus, if a TLB hit occurs on any cached non-leaf page table entries in the MMU TLB, only a lower level page table will need to be walked by the page table walker circuit to translate a VA to a PA. If a TLB miss occurs in the MMU TLB, the page table walker circuit can consult the in-memory TLB for a matching page table entry to translate the VA to a PA.

In this regard, in one exemplary aspect, a memory management system in a CPU in a processor of a processor-based system is provided. The memory management system comprises a page table in a system memory of the processor-based system, the page table comprising at least one level page table each comprising a plurality of page table entries each addressable by a VA and configured to store a PA associated with the VA, an MMU TLB comprising a plurality of MMU TLB entries each configured to store a cached page table entry in the page table, an in-memory TLB in the system memory, the in-memory TLB comprising a plurality of in-memory TLB entries each configured to store a cached page table entry in the page table, a page table walker circuit configured to access the plurality of page table entries in the at least one level page table in the page table based on the VA, and an MMU circuit. The MMU circuit is configured to receive a memory access request comprising a VA based on a computer software instruction executed for a process in the CPU and determine if an MMU TLB entry in the MMU TLB contains a page table entry comprising a PA corresponding to the VA. In response to determining the MMU TLB does not contain an MMU TLB entry containing a page table entry directly corresponding to the VA, the MMU circuit is also configured to determine if a VA stored in an in-memory TLB entry corresponding to the VA in an in-memory TLB allocated to the process in the system memory in the processor-based system matches the VA of the memory access request, and in response to determining the VA stored in the in-memory TLB entry matches the VA of the memory access request, translate the VA to a PA based the accessed page table entry in the in-memory TLB entry corresponding to the VA.

In another exemplary aspect, a method of translating a VA to a PA in a CPU in a processor of a processor-based system is provided. The method comprises receiving a memory access request comprising a VA based on a computer software instruction executed for a process in the CPU and determining if an MMU translation lookaside buffer (TLB) entry in an MMU TLB comprising a plurality of MMU TLB entries each configured to store a cached page table entry in a page table contains a page table entry comprising a PA corresponding to the VA. The page table entry is contained in the page table comprising at least one level page table each comprising a plurality of page table entries each addressable by a VA and configured to store a PA associated with the VA. In response to determining the MMU TLB does not contain an MMU TLB entry containing a page table entry corresponding to the VA, the method further comprises determining if a VA stored in an in-memory TLB entry corresponding to the VA in an in-memory TLB in the system memory of the processor-based system that is allocated to the process in a system memory in the processor-based system matches the VA of the memory access request. In response to determining the VA stored in the in-memory TLB entry matches the VA of the memory access request, the method also comprises translating the VA to a PA based the accessed page table entry in the in-memory TLB entry corresponding to the VA.

In another exemplary aspect, processor-based system is provided. The processor-based system comprises a system memory and a processor comprising one or more CPUs each configured to execute computer instructions in an operating system software program and one or more processes. Each CPU among the one or more CPUs comprises a memory management system, comprising a page table in the system memory, the page table comprising a plurality of level page tables each comprising a plurality of page table entries each addressable by a VA and configured to store a PA associated with the VA, an MMU TLB comprising a plurality of MMU TLB entries each configured to store a cached page table entry in the page table, an in-memory TLB in the system memory, the in-memory TLB comprising a plurality of in-memory TLB entries each configured to store a cached page table entry in the page table, a page table walker circuit configured to access a page table entry in at least one level page table in the page table based on the VA, and an MMU circuit. The MMU circuit is configured to receive a memory access request comprising a VA based on a computer software instruction executed for a process among the one or more processes in a CPU among the one or more CPUs and determine if an MMU TLB entry in the MMU TLB contains a page table entry comprising a PA corresponding to the VA. In response to determining the MMU TLB does not contain an MMU TLB entry containing a page table entry corresponding to the VA, the MMU circuit is also configured to determine if a VA stored in an in-memory TLB entry corresponding to the VA in an in-memory TLB allocated to the process in the system memory in the processor-based system matches the VA of the memory access request. In response to determining the VA stored in the in-memory TLB entry matches the VA of the memory access request, the MMU circuit is also configured to translate the VA to a PA based the accessed page table entry in the in-memory TLB entry corresponding to the VA.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
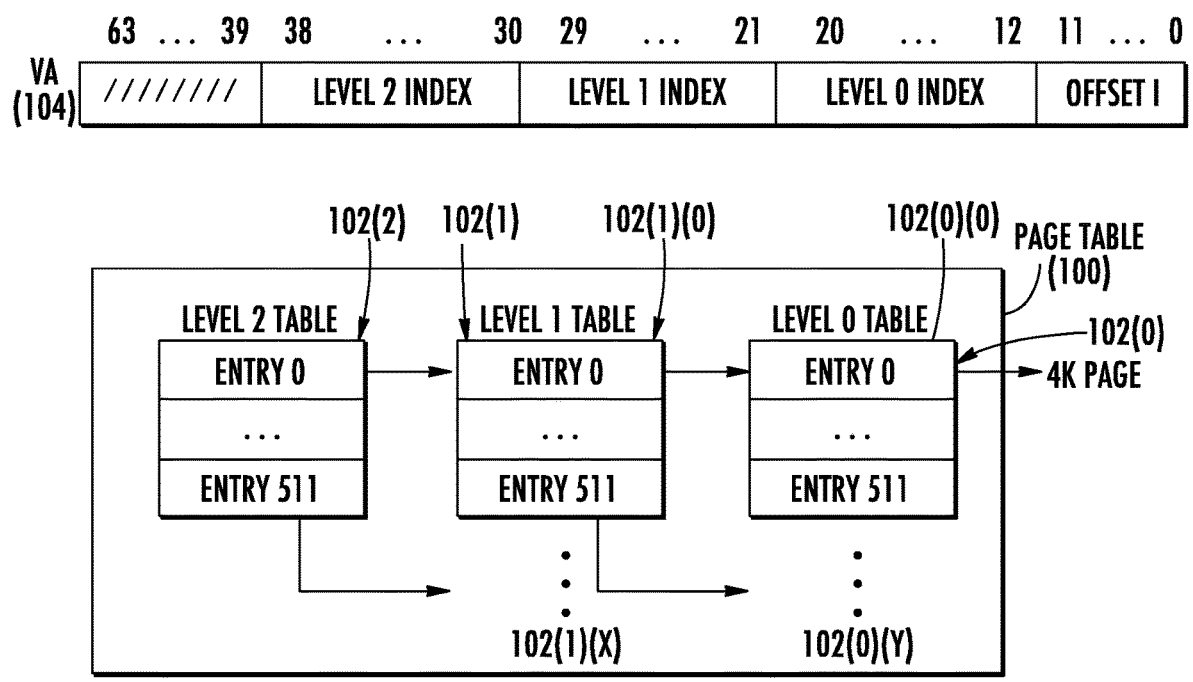
FIG. 1 is an example of a multiple level page table included in a memory management unit (MMU) of a processor for translating a virtual address (VA) to a physical address (PA) in memory.
Figure 2:
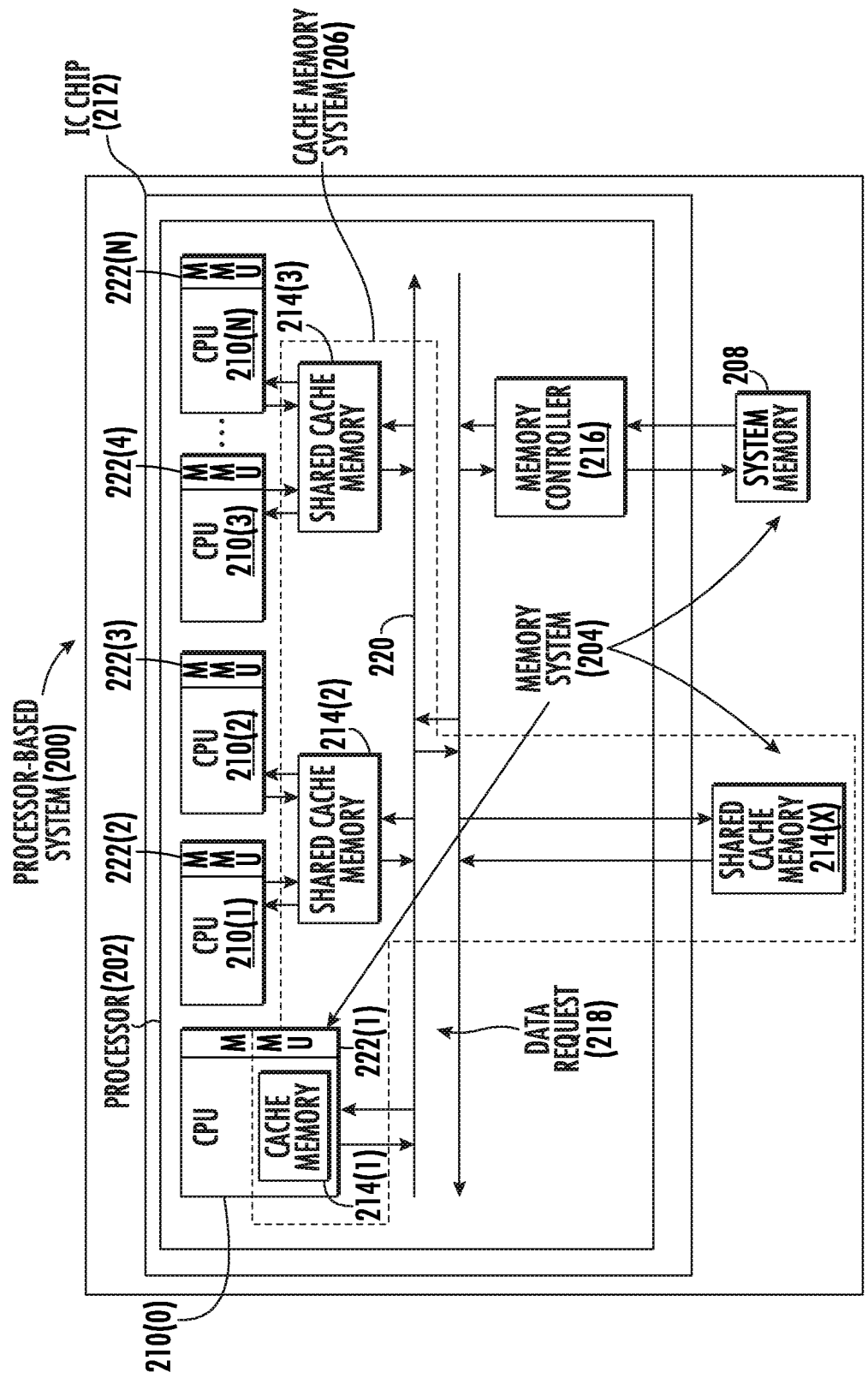
FIG. 2 is a diagram of an exemplary processor-based system that includes a processor with multiple central processing units (CPUs) each configured to process instructions fetched from memory that include instructions to fetch data from memory and store data to memory.
Figure 3:
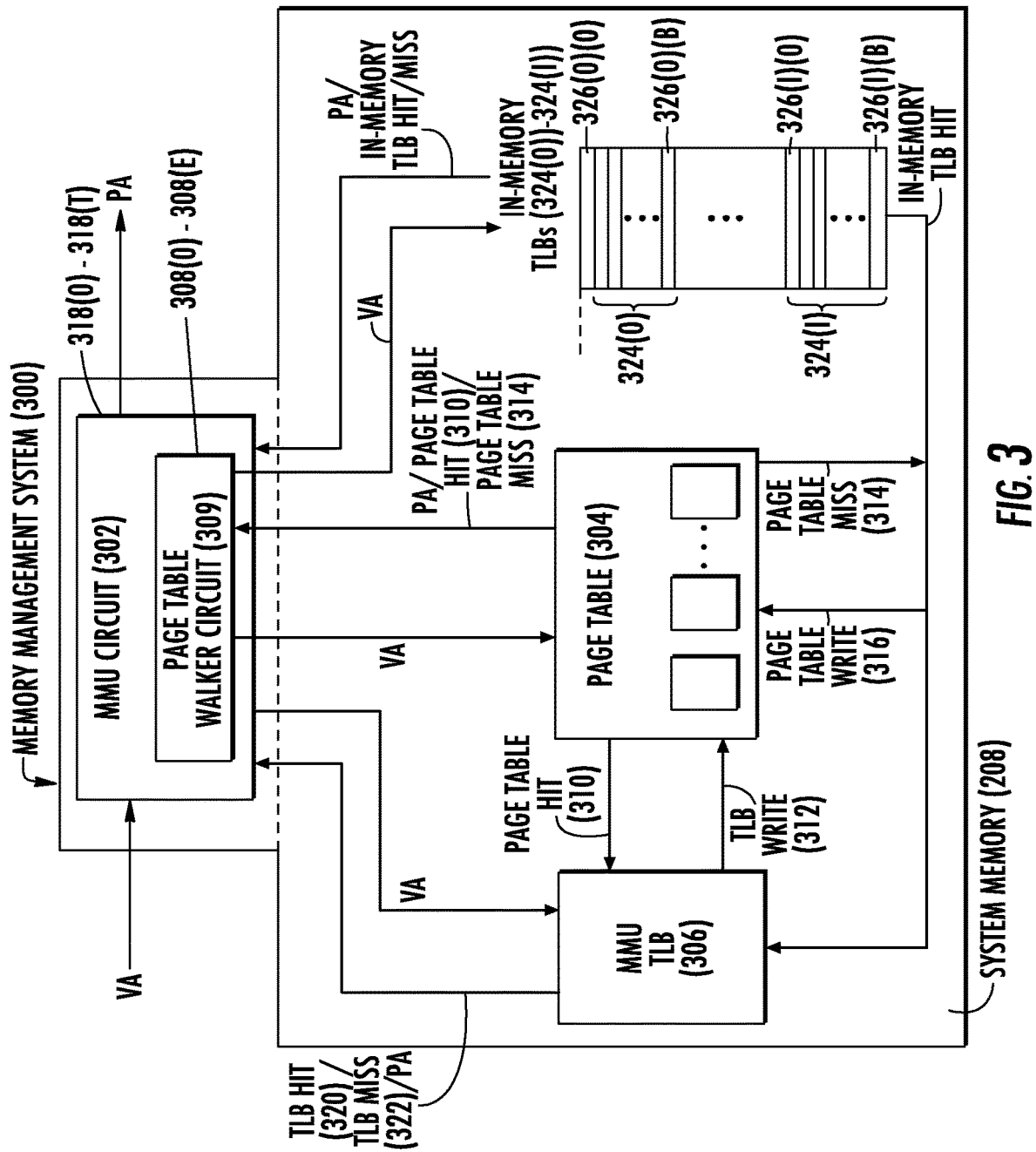
Figure 4A:
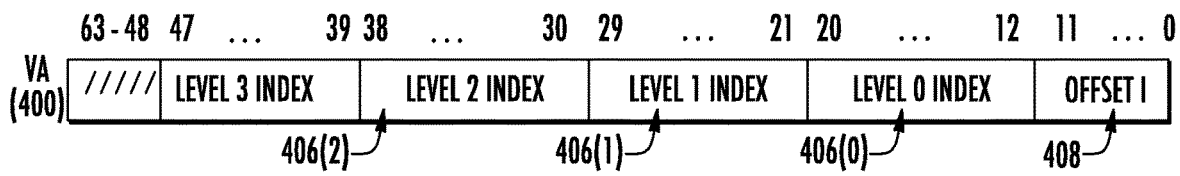
Figure 4B:
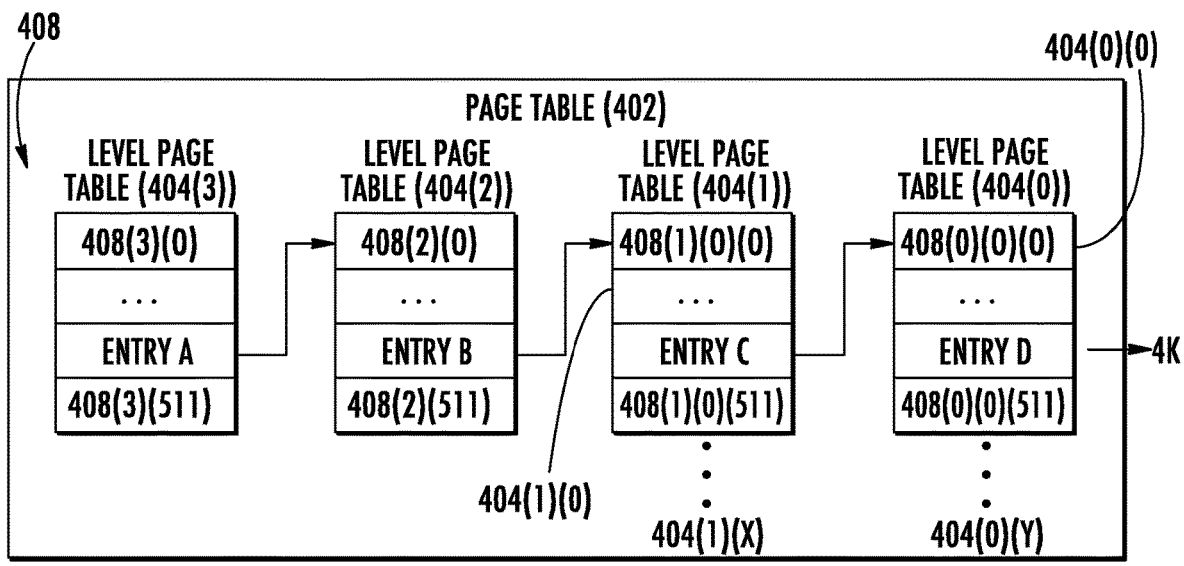
Figure 5A:
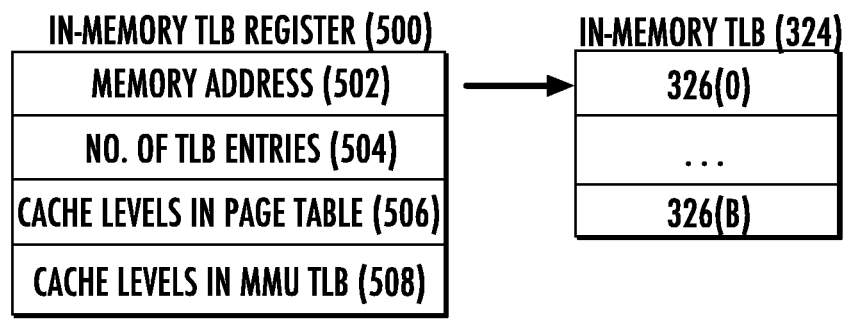
Figure 5B:
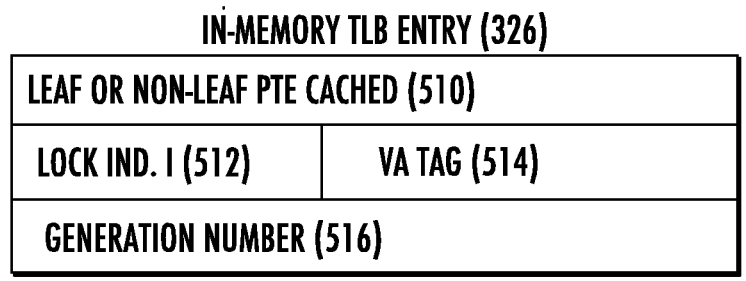
Figure 6:
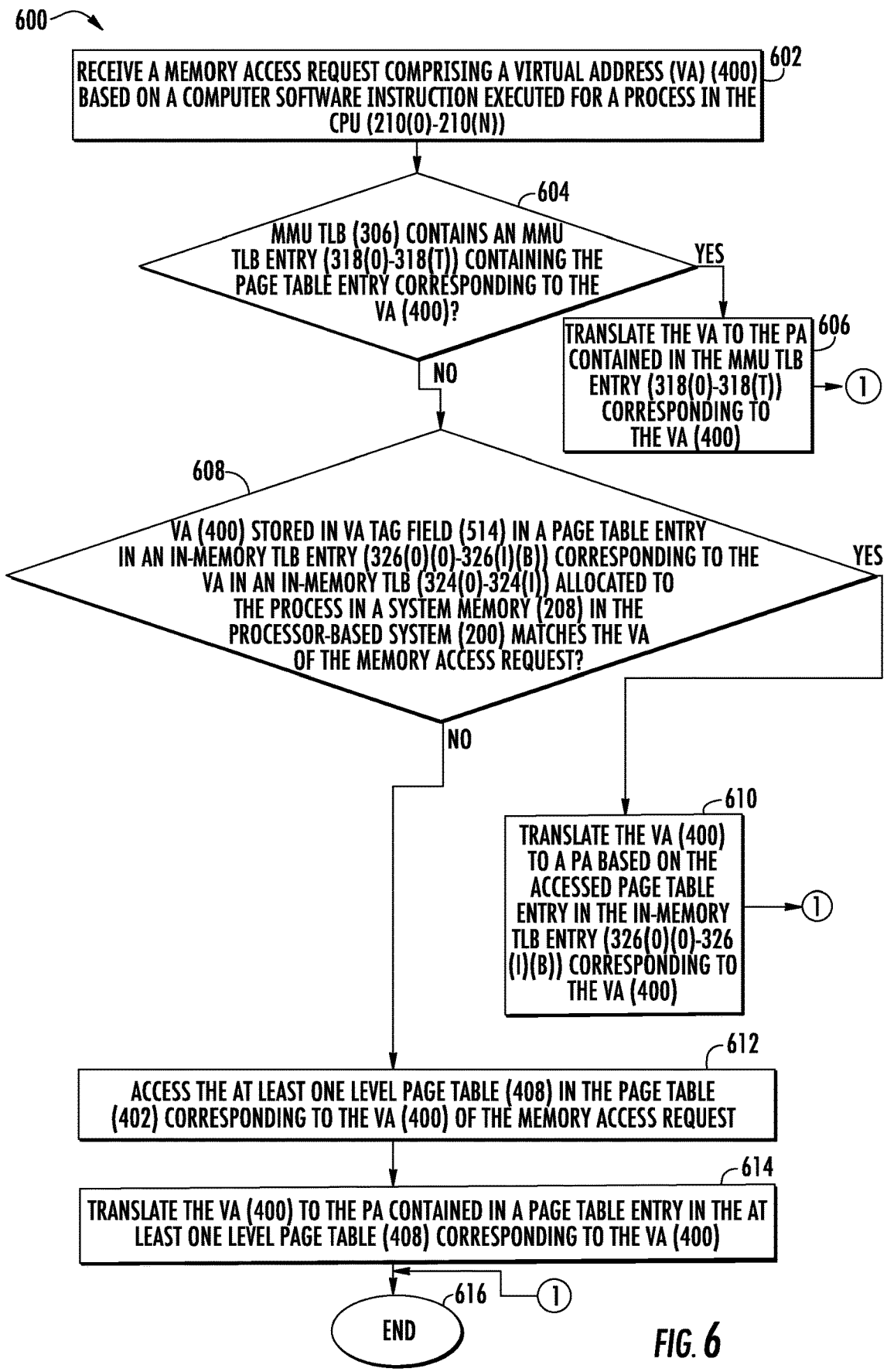
Figure 7A:
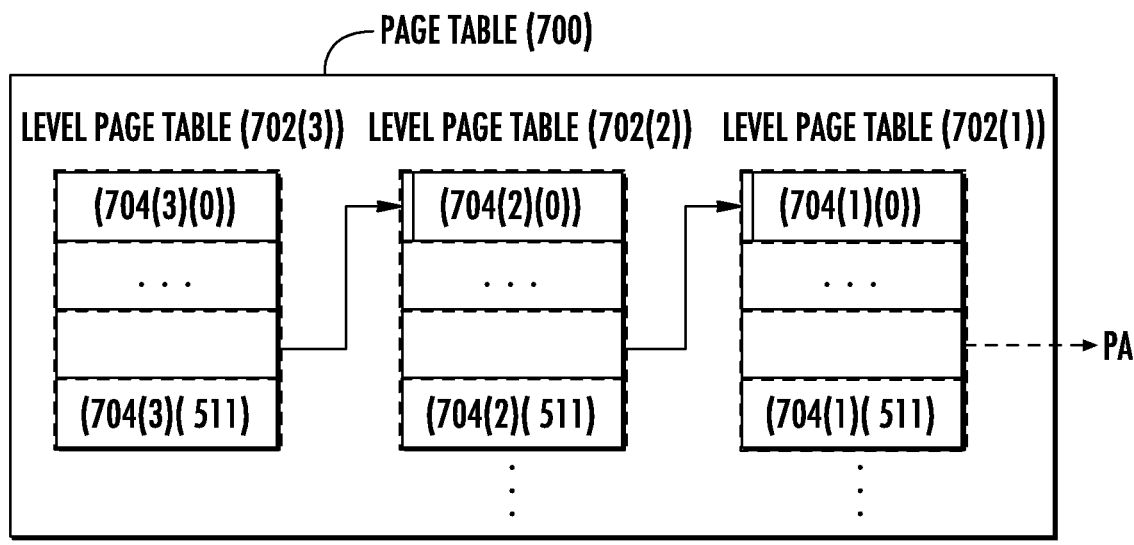
Figure 7B:
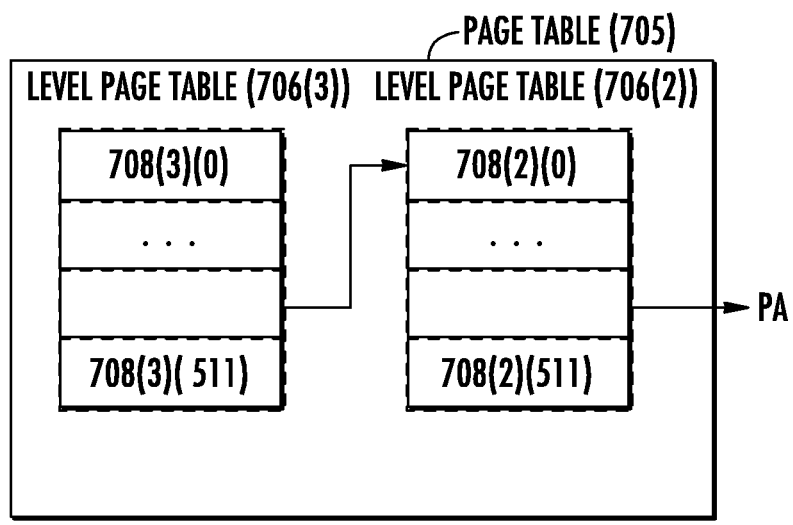
Figure 8:
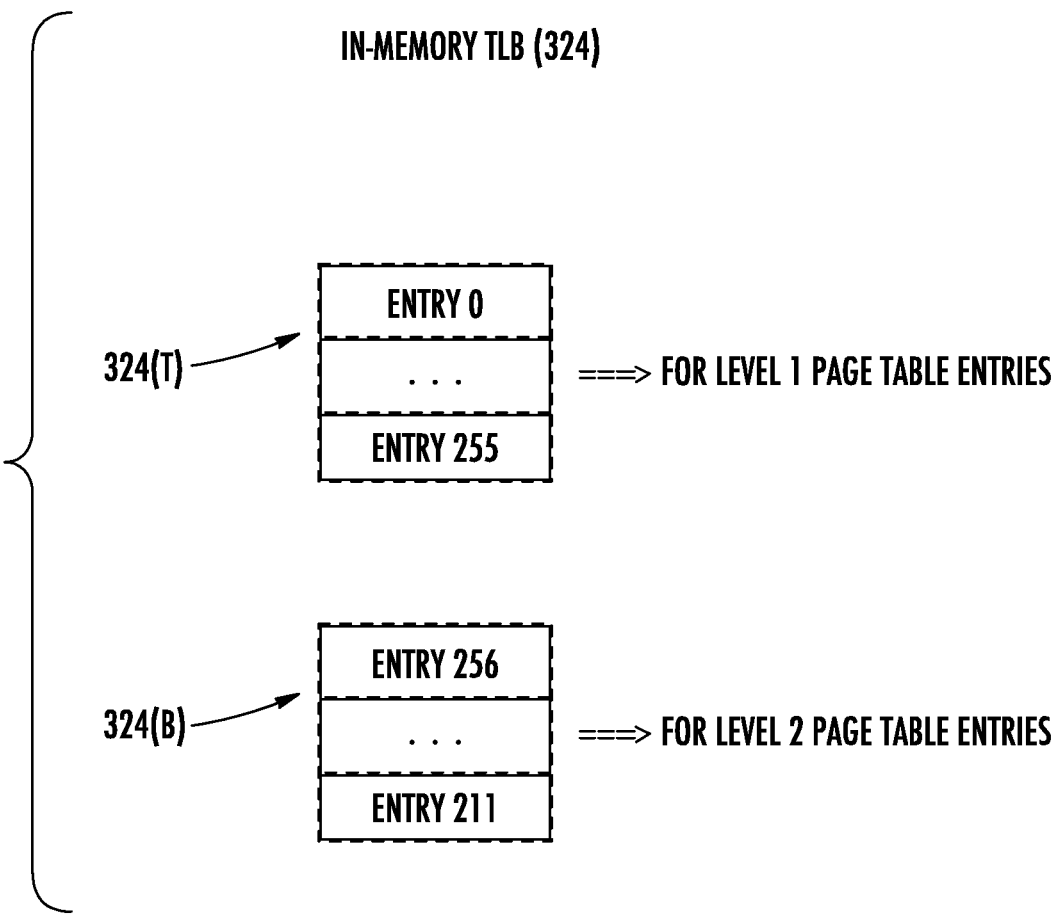
Figure 9:
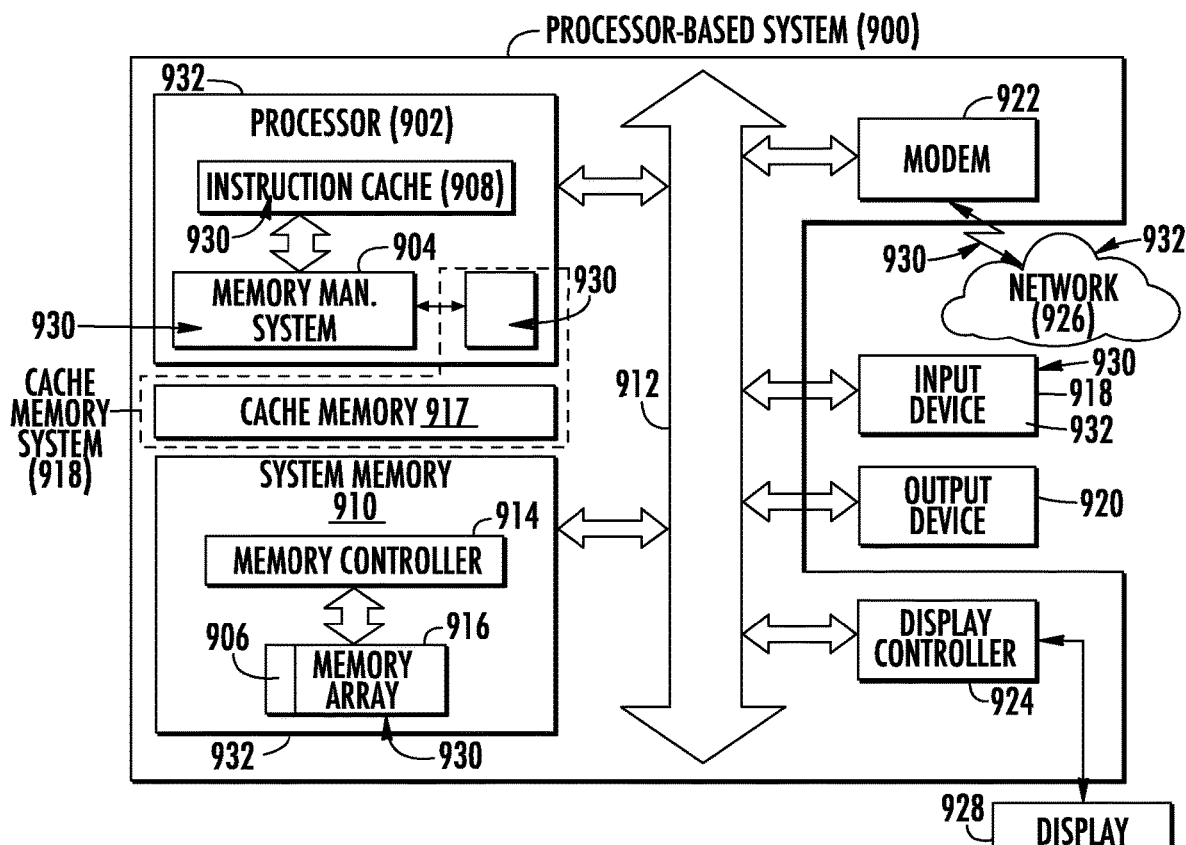

FIG. 3 is a schematic diagram of an exemplary memory management system that includes at least one MMU provided in a CPU and a system memory that includes a page table and an MMU translation lookaside buffer (TLB) for translating VA to PAs, and wherein the memory management system is further configured to include process dedicated in-memory TLBs in the system memory that is configured to store cached page table entries in the page table for translating a VA to PA in the event of a miss to the MMU TLB;

FIG. 4A illustrates an exemplary bit format of an exemplary VA that may be used by a CPU in the processor in FIG. 2 to address the memory system;

FIG. 4B illustrates an exemplary page table that can be provided in an MMU in FIG. 3, wherein the page table includes a plurality of level page tables each containing page table entries addressable by a VA;

FIG. 5A illustrates an exemplary in-memory TLB register that contains a memory address field configured to store a memory address pointing to an in-memory TLB in system memory;

FIG. 5B illustrates and exemplary in-memory TLB entry in an in-memory TLB in system memory;

FIG. 6 is a flowchart illustrating an exemplary process of an MMU in the memory management system in the processor in FIG. 3 translating a VA to a PA and accessing a process dedicated in-memory TLB in the system memory to translate a VA to a PA for a process;

FIGS. 7A and 7B are schematic diagrams of other multiple level page tables that contain leaf page table entries and can be included in a system memory in the memory management system in FIG. 3 for translating a VA to a PA;

FIG. 8 is a schematic diagram of an exemplary in-memory TLB that caches entries from multiple level page tables;

FIG. 9 is a block diagram of an exemplary processor-based system that includes a processor with one or more CPUs and includes a memory management system that includes at least one MMU provided in a CPU and a memory management system that includes a page table and an MMU TLB for translating VAs to PAs, and wherein the memory management system is further configured to include process dedicated in-memory TLBs in the system memory configured to store cached page table entries in the page table for translating a VA to a PA in the event of a miss to the MMU TLB, including but not limited to the processor in FIG. 2 and the memory management system in FIG. 3.

DETAILED DESCRIPTION

Aspects disclosed herein include process dedicated in-memory translation lookaside buffers (TLBs) (mTLBs) for augmenting a memory management unit (MMU) TLB for translating virtual addresses (VAs) to physical addresses (PA) in a processor-based system. The processor-based system includes a processor that has one or more central processing units (CPUs) each configured to execute computer software instructions for processes. The processor-based system also includes a memory system that includes a main physical memory that is addressable by a PA. The processor is a virtual memory system that employs virtual addressing to make available memory to a memory space greater than the number of physical memory space in the main system memory of the processor-based system. In certain examples, either a shared or dedicated MMU for each CPU is provided for converting VAs to PAs. The MMUs are associated with a TLB (the "MMU TLB") and a page table (which is a memory circuit) in a system memory. The system memory is a memory that is fully addressable by the PA space of the processor-based system. The MMU TLB is a cache memory associated with a MMU and is configured to cache page table entries in the page table to avoid the need to fully walk the page table if a page table entry in the page table for the VA to PA translation is contained in the MMU TLB.

In exemplary aspects disclosed herein, to augment an MMU TLB to reduce either having to walk the page table or perform a full page table walk to translate a VA to a PA, the processor-based system also supports an in-memory TLB allocated in the system memory. In this regard, in response to an MMU TLB miss for a VA to a PA translation, an in-memory TLB is accessed to determine if a page table entry for the VA to PA translation is contained in the in-memory TLB. If a page table entry for the VA to PA translation is contained in the in-memory TLB, the page table entry in the in-memory TLB is used to perform the VA to PA translation. In this manner, additional page table entries can be cached for VA to PA translation without having to expand the size of an MMU TLB. The in-memory TLB can be sized to provide a higher hit rate if desired. If a page table entry for the VA to PA translation is not contained in the in-memory TLB, the MMU walks its page table to perform the VA to PA translation.

In examples disclosed herein, a, dedicated in-memory TLB is supported in system memory for each process in the processor and which are not shared across processes, so that one process's cached page table entries do not displace another process's cached page table entries. In this regard, each CPU in the processor supports storing of pointer addresses to the in-memory TLBs in system memory so that the MMUs in the CPUs can access the dedicated in-memory TLB corresponding to a particular process. A dedicated in-memory TLB may also be supported for an operating system kernel and/or a hypervisor that supervises virtualization of guest processes executing on a host CPU in examples disclosed herein. When a process is scheduled to execute in a CPU, the in-memory TLB address stored for such process can be loaded into an in-memory TLB register in the CPU. This allows the page table walker circuit of the MMU to access the dedicated in-memory TLB for the executing process for performing VA to PA translations in the event of a TLB miss to the MMU TLB. If a TLB miss occurs to the in-memory TLB for an executing process, the page table walker circuit of the MMU can walk the page table. Supporting dedicated in-memory TLBs per process also allows allocation of different sized in-memory TLBs for different processes, if desired, to have different sized in-memory TLBs, which may be based on their memory access patterns and the number of process threads sharing an in-memory TLB as examples. In another example, the in-memory TLBs being in system memory is direct memory-mapped to memory addresses, which can also simplify the cached page table entry replacement policy.

In other examples, the in-memory TLBs can be configured to cache different levels of page table entries in a page table into an MMU TLB. In another example, the in-memory TLBs can be configured to cache only certain levels of level page tables in a page table into an MMU TLB. For example, in-memory TLBs associated with a given MMU can be configured to cache page table entries from a higher level page table than the page table entries cached in the MMU TLB for enhanced performance. Thus, if a TLB hit occurs on any cached non-leaf page table entries in the MMU TLB, only a lower level page table will need to be walked by the page table walker circuit to translate a VA to a PA. If a TLB miss occurs in the MMU TLB, the page table walker circuit can consult the in-memory TLB for a matching page table entry to translate the VA to a PA.

Before discussing examples of process dedicated mTLBs for augmenting an MMU TLB for translating VAs to PAs in a processor-based system, an exemplary processor-based system that includes a processor with one or more CPUs is first discussed with regard to FIG. 2.

In this regard, FIG. 2 is a diagram of an exemplary processor-based system 200 that includes a processor 202 configured to issue memory requests (i.e., data read and data write requests) to a memory system 204 that includes a cache memory system 206 and a system memory 208. The system memory 208 is a memory that is fully addressable by the PA space of the processor-based system 200. For example, the system memory 208 may be a dynamic random access memory (DRAM) provided in a separate DRAM chip. The processor 202 includes one or more respective CPUs 210(0)-210(N), wherein 'N' is a positive whole number representing the number of CPUs included in the processor 202. The processor 202 can be packaged in an integrated circuit (IC) chip 212. The cache memory system 206 includes one or more cache memories 214(1)-214(X) that may be at different hierarchies in the processor-based system 200 and that are logically located between the CPUs 210(0)-210(N) and the system memory 208, where 'X' is a positive whole number representing the number of CPUs included in the processor 202. A memory controller 216 controls access to the system memory 208. For example, a CPU 210(0)-210(N) as a requesting device may issue a data request 218 to read data in response to processing a load instruction. The data request 218 includes a target address of the data to be read from memory. Using CPU 210(0) as an example, if the requested data is not in a private cache memory 214(1) (i.e., a cache miss to cache memory 214(1)) which may be considered a level one (L1) cache memory, the private cache memory 214(1) sends the data request 218 over an interconnect bus 220 in this example to a shared cache memory 214(X) shared with all of the CPUs 210(0)-210(N), which may be a level (3) cache memory. The requested data in the data request 218 is eventually either fulfilled in a cache memory 214(1)-214(X) or the system memory 208 if not contained in any of the cache memories 214(1)-214(X).

The processor-based system 200 in FIG. 2 is configured to support virtual addressing. In this regard, an operating system that executes processes on the processor 202 can use virtual memory as a virtual memory system by issuing VAs in memory access requests. In virtual memory systems, each process is given the impression that a larger number of memory addresses (i.e., VAs) are available in the memory system 204 for retrieving and storing data than PAs in the system memory 208. When a process requests access to data in the memory system 204, the process provides a memory address that is a VA. The VA must then be mapped to an actual PA in the memory system 204 where the data is to be stored or retrieved. In this regard, each CPU 210(0)-210(N)

in the processor 202 in FIG. 2 may contain or have an associated an MMU 222(0)-220(N) that is employed to translate VAs to PAs.

FIG. 3 is a schematic diagram of an exemplary memory management system 300 that includes an MMU circuit 302 associated with CPU 210(0)-210(N) in the processor 202 in FIG. 2 that translates a VA to a PA for memory access requests issued by a respective associated CPU 210(0)-210(N). The memory management system 300 includes a page table 304 and an MMU TLB 306 in system memory 208 that are accessed by the MMU circuit 302 for converting VAs to PAs. The page table 304 is a memory circuit that includes a number of page table entries 308(0)-308(E) that are indexable based on the VA to provide information for translation from the VA to a PA. The page table 304 is accessed or "walked" by a page table walker circuit 309 in the MMU circuit 302 based on the incoming VA, in response to a TLB miss and in-memory TLB miss (discussed below), in response to a computer software instruction executed by a respective CPU 210(0)-210(N) to determining if page table entries 308(0)-308(E) containing information to translate the VA to a PA is present. If so, a "page table hit" 310 is issued by the page table 304, and the MMU circuit 302 provides the PA for the memory access request to the MMU TLB 306. The translated PA is also written as a "TLB write" 312 to the MMU TLB 306. If the page table entries 308(0)-308(E) in the page table 304 do not contain information to translate the VA to a PA, a "page table miss" 314 is issued by the page table 304, and a memory management fault and trap occurs or an exception is communicated to the operating system to be processed. The page table 304 may include a number of page table levels that have to be "walked" by the page table walker circuit 309 to translate the incoming VA to a PA.

To increase performance in translating VAs to PAs, a VA translated by accessing the page table 304 and the PA information resulting from an issued "page table hit" 310 is also cached (i.e., written) in the MMU TLB 306. The MMU TLB 306 is a cache memory that is faster memory than the page table 304 in this example. The MMU TLB 306 has a plurality of MMU TLB entries 318(0)-318(T) that are each configured to store a PA associated with a given VA. The VA stored in the MMU TLB entries 318(0)-318(T) are tags that can be compared against an incoming VA in a received memory access request before accessing the page table 304 to determine if any MMU TLB entry 318(0)-318(T) is present in the MMU TLB 306 that has the translated PA. If so, a "TLB hit" 320 is issued by the MMU TLB 306 without the page table 304 having to be walked, and the MMU circuit 302 provides the PA in the hit MMU TLB entry 318(0)-318(T) for the memory access request. If the incoming VA in a received memory access request is not present in any MMU TLB entry 318(0)-318(T) in the MMU TLB 306, a "TLB miss" 322 is issued, and the VA can be used to walk the page table 304 to translate the incoming VA to the PA as discussed above.

When a workload is executed on a CPU 210(0)-210(N) in the processor 202 in FIG. 2, multiple processes and the operating system kernel compete for access to the MMU TLB 306. As the stress of the workload on memory system 204 increases, the MMU TLB 306 can start to thrash, meaning TLB misses and resulting evictions and insertions occur frequently, which degrades performance. In exemplary aspects disclosed herein, to augment the MMU TLB 306 to reduce the number of page table 304 walks to translate a VA to a PA, the memory management system 300 in FIG. 3 also supports in-memory TLBs 324(0)-324(I) allocated in system memory 208. In response to a TLB miss to the MMU TLB 306 for a VA to a PA translation, an in-memory TLB 324(0)-324(I) can be accessed to determine if a page table entry in an in-memory TLB entry in the accessed in-memory TLB 324(0)-324(I) is present to translate the VA to its PA. Each in-memory TLB 324(0)-324(I) contains a plurality of in-memory TLB entries 326(0)(0)-326(I)(B) that are each configured to cache a page table entry 308(0)-308(E) in the page table 304. If a page table entry 308(0)-308(E) for the VA to PA translation is contained in an in-memory TLB entry 326(0)(0)-326(I)(B) in the accessed in-memory TLB 324(0)-324(I), such page table entry 308(0)-308(E) in the accessed in-memory TLB 324(0)-324(I) is used to perform the VA to PA translation. In this manner, additional page table entries can be cached for VA to PA translations without having to expand the size of the MMU TLB 306. System memory 208, which is more abundant and cheaper for a given memory size, is allocated for the in-memory TLBs 324(0)-324(I). If a page table entry for the VA to PA translation is not contained in the accessed in-memory TLB 324(0)-324(I), the MMU circuit 302 causes the page table walker circuit 309 to walk the page table 304 as previously discussed above to perform the VA to PA translation.

As will be discussed in more detail below, the memory management system 300 in FIG. 3 is configured to support allocation of each in-memory TLB 324(0)-324(I) in system memory 208 being dedicated to a specific process executed in the CPUs 210(0)-210(N) and thus not shared between different processes. For example, in-memory TLB 324(0) is dedicated for one process executed in the CPUs 210(0)-210(N), whereas in-memory TLB 324(X) is assigned to a different process executing in the CPUs 210(0)-210(N). In this regard, each CPU 210(00-210(N) in the processor 202 in FIG. 2 supports storing addresses of the in-memory TLBs 324(0)-324(I) in system memory 208 allocated to respective processes so that page table entries cached in in-memory TLB entries 326(0)(0)-326(0)(B) in the in-memory TLB 324(0) for example, do not displace page table entries in in-memory TLB entries 326(0)(0)-326(0)(B) in in-memory TLB 324(I). In this manner, the in-memory TLBs 324(0)-324(I) are not shared across processes. The in-memory TLBs 324(0)-324(I) can be shared across multiple CPUs 210(0)-210(N) as multiple CPUs 210(0)-210(N) can execute the same process. A dedicated in-memory TLB may also be supported for an operating system kernel and/or a hypervisor in the processor 202 that supervises virtualization of guest processes executed on a host CPU 210(0)-210(N) as examples.

When a process is scheduled to execute in CPU(s) 210(0)-210(N), an in-memory TLB address stored for such process can be loaded into the MMU circuit 302 associated with the CPU 210(0)-210(N). This allows the MMU circuit 302 to access the dedicated in-memory TLB 324(0)-324(I) for executing the process for performing VA to PA translations in the event of a TLB miss to the MMU TLB 306 and a TLB hit to the in-memory TLB 324(0)-324(I), which may avoid the page table walker circuit 309 having to walk the page table 304. If a TLB miss occurs to the in-memory TLB 324(0)-324(I) for an executed process, the page table walker circuit 309 can walk the page table 304 as previously discussed. The memory management system 300 supporting the process dedicated in-memory TLBs 324(0)-324(I) can also allow allocation of different sized in-memory TLBs 324(0)-324(I) for different processes, if desired. It may be desired to provide different sized in-memory TLBs 324(0)-324(I) based on their memory access patterns by respective processes and the number of process threads sharing an in-memory TLB 324(0)-324(I) as examples. In another example, the in-memory TLBs 324(0)-324(I) being in system memory 208 allows the in-memory TLBs 324(0)-324(I) to be direct memory-mapped to memory addresses, which can also simplify the cached page table entry replacement policy. The examples discussed below explain in more exemplary detail operations of an MMU circuit like the MMU circuit 302 in FIG. 3 accessing its in-memory TLBs 324(0)-324(I) for a given process being executed in the CPUs 210(0)-210(N) to translate VAs to PAs in memory access requests issued as a result of executing the process.

In this non-limiting example, the bit size of the VA memory addresses supported by the processor-based system 200 in FIG. 2 is 64 bits. In this regard, FIG. 4A illustrates an exemplary bit format of an exemplary VA 400 supported by the processor-based system 200 that shows the bit assignment of bits 63-0. Bits 63-48 are free bits that are unused or can be reserved for additional functionality. The address space of the VA 400 is 48 bits that spans bits 47-0 to support $2^{48}$ virtual memory locations in the processor-based system. The bits of the VA 400 can be used to index a page table, which may be employed as the page table 304 in the memory management system 300 in FIG. 3. FIG. 4B illustrates an exemplary page table 402 that can be provided in the MMU circuit 302 in FIG. 3, wherein the page table 402 includes four (4) levels of level page tables 404(3)-404(0) each containing page table entries addressable by the VA 400. Each page table entry in the level page tables 404(3)-404(0) is either a leaf page table entry that is not used to further access another page table entry and can be directly associated with a memory page in physical memory in the system memory 208, or a non-leaf page table entry that is used to further access another page table entry to obtain the PA of a memory page in the system memory 208 and can be cached in this example.

With continuing reference to FIG. 4B, the level page tables 404(3)-404(0) in the page table 402 are organized to provide for a base page size of 4 Kilobytes (KB) where the number of page table entries in each level page table 404(3)-404(0) is 512 (i.e., addressable by 9 bits) with a 39 bit VA 400 address space supported. The level page table 404(3) contains page table entries 408(3)(0)-408(3)(511) and designed to not be cached in the in-memory TLBs 324(0)-324(I) of FIG. 3 in this example. The level 2 page table 404(2) is at level 2 in the page table 402 and is indexed by a level 2 index 406(2) in bits 38-30 of the VA 400. Page table entries (512 or 29 entries) 408(2)(0)-408(2)(511) of the level 2 page table 404(2) each point to one of an 'X' number of level 1 page tables 404(1)(0)-404(1)(X), which is then indexed by a level 1 index 406(1) in bits 29-21 of the VA 400. The page table entries (512 or 29 entries) 408(1)(0) (0)-408(1)(X)(511) (i.e., level page table at level (1), 0-X number of level 1 page table, and 0-511 entries per level page table) in each of the level 1 page tables 404(1)(0)-404 (1)(X) points to one of 'Y' number of level 0 page tables 404(0)(0)-404(0)(Y), which is then indexed by a level 0 index 406(0) in bits 20-12 of the VA 400. In this example, page table entries 408 accessed across the level page tables 404(2), 404(1)(0)-404(1)(X), 404(0)(0)-404(0)(Y) in the page table 402 identify a 4 KB page PA in the system memory 208 in the processor-based system 200 in FIG. 2. The offset bits of PA for the VA 104 is the offset in the VA 400, which is in bits 11-0 of the VA 400 in this example.

As an example, as will be discussed in more detail below, the memory management system 300 in FIG. 3 can be configured to cache different levels of level page tables 404(2), 404(1)(0)-404(1)(X), 404(0)(0)-404(0)(Y) in different memory structures. For example, the page table entries 408(2)(0)-408(2)(511) of the level 2 page table 404(2) may be cached in the in-memory TLB 324(0)-324(I), whereas the page table entries 408(1)(0)(0)-408(1)(X)(511) in the level 1 page table 404(1)(0)-404(1)(X) may be cached in the MMU TLB 306 in the MMU circuit 302 in FIG. 3. The page table entries 408(0)(0)(0)-408(0)(Y)(511) in the level 0 page table 404(0)(0)-404(0)(Y) are leaf page table entries that can be cached in the MMU TLB 306.

As discussed above, a dedicated in-memory TLB 324(0)- 324(I) in the memory management system 300 in FIG. 3 can be provided per process executing in the CPUs 210(0)-210 (N) in the processor 202 in FIG. 2. Thus, in an example, when a thread of a process is scheduled to execute on a CPU 210(0)-210(N) in the processor 202, a mechanism is provided to indicate the particular in-memory TLB 324(0)-324 (I) allocated in system memory 208 to the process so that the MMU circuit 302 can know where in the system memory 208 to access a dedicated in-memory TLB 324(0)-324(I) for the process. In this regard, a CPU 210(0)-210(N) 3 can include an in-memory TLB register that contains a memory address field configured to store a memory address pointing to a PA in system memory 208 to an in-memory TLB 324(0)-324(I) corresponding to a current process to be executed in the CPU 210(0)-210(N). An example of such an in-memory TLB register 500 is illustrated in FIG. 5A. As shown in FIG. 5A, the in-memory TLB register 500 includes a memory address field 502 that is configured to store a physical address pointing to an in-memory TLB 324(0)-324 (I) corresponding to a current process to be executed in the CPU 210(0)-210(N). For a host that runs directly on a CPU 210(0)-210(N), such as a host hypervisor, the memory address field 502 could be the host PA. For a guest that runs directly on a CPU 210(0)-210(N), the memory address field 502 could be the guest PA. Also in this example, the in-memory TLB register 500 includes a number of TLB entries field 504 that is configured to store the number of in-memory TLB entries 326(0)(0)-324(I)(B) in the contained in-memory TLB 324(0)-324(I). This is so that the in-memory TLB 324(0)-324(I) will know the size in terms of number of in-memory TLB entries 326(0)(0)-324(I)(B) allocated in the in-memory TLB 324(0)-324(I) identified by the memory address in the memory address field 502. In this example, the in-memory TLB register 500 also includes a cache level in page table field 506 that is configured to store a number to indicate which levels in the level page tables 404 of the page table 402 in FIG. 4 to cache in the in-memory TLB 324(0)-324(I) identified in the memory address field 502. Also in this example, the in-memory TLB register 500 includes a cache level in MMU TLB field 508 that is configured to store a number indicate which levels in the level page tables 404 of the page table 402 to cache in the MMU TLB 306.

FIG. 5B illustrates an exemplary in-memory TLB entry 326 that represents the architecture of the in-memory TLB entries 326(0)(0)-326(I)(B) in an in-memory TLB 324(0)- 324(I) in FIG. 3 as an example. As shown therein, the in-memory TLB entry 326 includes a leaf or non-leaf page table entry cached field 510 configured to store in the in-memory TLB entry 326 either a leaf or non-leaf page table entry. The in-memory TLB entry 326 also includes a lock indicator 512 configured to store a lock state as the in-memory TLB entry 326 being in a locked state or unlocked state. For example, a '0' bit could signify an unlocked state, and a '1' could signify a locked state. As discussed below, the lock indicator 512 can be edited by the MMU circuit 302 to indicate if a given in-memory TLB entry 326 in an in-memory TLB 324(0)-324(I) is being used in case there are two page table walkers configured to race with each other to access the read or write the same in-memory TLB entry 326 in an in-memory TLB 324(0)-324(I). The in-memory TLB entry 326 also includes a VA tag field 514 configured to store a VA corresponding to the in-memory TLB entry 326 that can be used by the MMU circuit 302 to compare against an incoming VA to be translated to a PA to determine if the in-memory TLB entry 326 can be used to translate the VA to its PA. The in-memory TLB entry 326 in this example also includes a generation number field 516 configured to store a generation number. As will be discussed in more detail below, the generation number stored in the generation number field 516 can be used to determine if in-memory TLB entry 326 is valid and to provide a way to invalidate the in-memory TLB entry 326.

FIG. 6 is a flowchart illustrating an exemplary process 600 of the MMU circuit 302 in the memory management system 300 in FIG. 3 translating a VA to a PA and accessing a process dedicated in-memory TLB 324(0)-324(I) in the system memory 208 to translate a VA to a PA. The process 600 in FIG. 6 is discussed in conjunction with the memory management system 300 in FIG. 3 and the page table 402 in FIG. 4B. In this regard, the MMU circuit 302 receives a memory access request comprising a VA 400 based on a computer software instruction executed for a process in the CPU 210(0)-210(N) (block 602). The MMU circuit 302 determines if the MMU TLB 306 contains an MMU TLB entry 318(0)-318(T) containing the page table entry corresponding to the VA 400 (block 604). If the MMU TLB 306 contains an MMU TLB entry 318(0)-318(T) containing the page table entry corresponding to the VA 400 (block 604), this is an MMU TLB hit, and the MMU circuit 302 uses the PA stored in the MMU TLB entry 318(0)-318(T) corresponding to the VA 400 to translate the VA 400 into its PA (block 606), and the process ends (block 616). If however, the MMU TLB 306 does not contain an MMU TLB entry 318(0)-318(T) containing the page table entry corresponding to the VA 400 (block 604), this is an MMU TLB miss, and the MMU circuit 302 then determines if the VA 400 in the VA tag field 514 stored in an in-memory TLB entry 326(0)(0))-324(I)(B) in an in-memory TLB 324(0)-324(I) allocated to the process matches the VA 400 of the memory access request (block 608). As discussed above, the MMU circuit 302 can use the memory address stored in the memory address field 502 of the in-memory TLB register 500 to access the corresponding in-memory TLB 324(0)-324(I) for the process.

If the VA stored in the VA tag field 514 in an in-memory TLB entry 326(0)(0))-326(I)(B) in an in-memory TLB 324(0)-324(I) allocated to the process matches the VA 400 of the memory access request, the MMU circuit 302 uses contents of the matching in-memory TLB entry 326(0)(0))-326(I)(B) (block 608). This is an in-memory TLB hit. If the in-memory TLB entry 326(0)(O)-326(I)(B) contains a leaf page table entry, the MMU circuit 302 translates the VA 400 to a PA based on the accessed page table entry in the in-memory TLB entry 326(0)(0)-326(I)(B) having a VA in the VA tag field 514 matching the VA 400 (block 610). If the in-memory TLB entry 326(0)(0))-326(I)(B) contains a non-leaf page table entry, the page table walker circuit 309 uses the non-leaf page table entry to walk the page table 304. Otherwise, for an in-memory TLB miss, if the VA stored in the VA tag field 514 in an in-memory TLB entry 326(0)(0))-324(I)(B) in an in-memory TLB 324(0)-324(I) allocated to the process does not match the VA 400 of the memory access request (block 608), this is an in-memory TLB miss, and the MMU circuit 302 conducts a page table walk. The MMU circuit 302 causes the page table walker circuit 309 to access the level page tables 404(3)-404(0) in the page table 402 indexed by the VA 400 of the memory access request (block 612) and translate the VA 400 to the PA contained in a page table entry in the level page tables 404(3)-404(0) corresponding to the VA 400 (block 614), and the process ends (block 616).

As an example, assuming the base page size that can be determined from the page table 402 in FIG. 4B is 4 KB, and each intermediate level page table 404(3)-404(0) has 512 entries. Also assume that the in-memory TLB register 500 discussed in FIG. 5A for an in-memory TLB 324(0)-324(I) has a memory address of its PA in system memory 208 in its memory address field 502, 256 TLB entries in the number of TLB entries field 504, levels cached in the in-memory TLB 324(0)-324(I) as level 2 (bitmap represented as '100') in the levels cached in the page table levels to cache field 506, and levels cached in the MMU TLB 306 as level 1 (bitmap represented as '010') in the levels cached in the page table levels to cache field 508. In this example, a level 0 leaf page table entry 408(0)(0)(O)-408(0)(Y)(511) in the level 0 page table 404(0)(0)-404(0)(Y) points to a 4 KB memory page. A level 1 leaf page table entry 408(1)(0)(0)-408(1)(0)(511) in the level 1 page table 404(1)(0)-404(1)(X) points to a 2 MB memory page. A level 2 leaf page table entry 408(2)(0)(0)-408(2)(0)(511) in the level 2 page table 404(2)(0)-404(2)(511) points to a 1 GigaByte (GB) memory page. A level 1 non-leaf page table entry 408(1)(0)(0)-408(1)(0)(511) in the level 1 page table 404(1)(0)-404(1)(X) points to a level 0 page table 404(0)(0)-404(0)(Y). A level 2 non-leaf page table entry 408(2)(0)-408(2)(511) in the level 2 page table 404(2)(0)-404(2)(511) points to a level 1 page table 404(1)(0)-404(1)(X). In this example, leaf page table entries can always be cached in the MMU TLB 306, non-leaf page table entries 408(1)(0)(0)-408(1)(0)(511) can be cached in the MMU TLB 306, and leaf and non-leaf level 2 page table entries 408(2)(0)-408(2)(511) can be cached in an in-memory TLB 324(0)-324(I).

In this example, the span of a single in-memory TLB entry 326(0)(0)-326(I)(B) is 1 GB. For a given incoming VA 400 to translate into a PA, the MMU circuit 302 calculates the index into the in-memory TLB 324(0)-324(I) for the current process for the VA 400 as follows. The index is the (VA/1 GB) % 256. If an in-memory TLB miss occurs (e.g., block 608 in FIG. 6), the MMU circuit 302 causes the page table walker circuit 309 to walk the page table 402 from the top level and find the leaf page table entry 408 for the VA 400. The leaf page table entry 408 is then written into the MMU TLB 306. If the leaf page table entry 408 corresponding to the VA 400 is above the level 2 page table 404(2), no further caching is done. If the leaf page table entry 408 corresponding to the VA 400 is at the level 2 page table 404(2), it is cached in the in-memory TLB 324(0)-324(I) and the MMU TLB 306. If the leaf page table entry 408 corresponding to the VA 400 is at the level 1 or level 0 page table 404(1), 404(0), the non-leaf page table entry 408 in the level 2 page table 404(2) is cached in the in-memory TLB 324(0)-324(I) and the MMU TLB 306. When the page table entry 408 is cached into the in-memory TLB 324(0)-324(I) as an in-memory TLB entry 326(0)(0)-326(I)(B), the VA bits of the VA 400 are truncated to a 1 GB boundary to be stored in the VA tag field 514 of the in-memory TLB entry 326(0)(0)-326(I)(B). A current generation number that is discussed in more detail below is stored in the generation number field 516 of the in-memory TLB entry 326(0)(0)-326(I)(B). In this manner, it can be precisely controlled which page table levels get cached into the MMU TLB 306 and cached in the in-memory TLB entry 326(0)(0)-326(I)(B) for a current process.

As discussed above, when an MMU TLB hit occurs (e.g., in block 606 in FIG. 6), this means the leaf page table entry 408 for the VA 400 is found in the MMU TLB 306, and no page table walk into the page table 402 is required. If the leaf page table entry 408 has been evicted from the MMU TLB 306, but the level 1 page table entry is still present in the MMU TLB 306, the page table walker circuit 309 can walk the page table 402 from the level 1 page table entry 408. If the level 1 page table entry is not found in the MMU TLB 306, the MMU circuit 302 consults the in-memory TLB 324(0)-324(I) for the current process. If an in-memory TLB hit occurs, the MMU circuit 302 walks from the level 2 page table entry stored in the in-memory TLB 324(0)-324(I).

Additional functionality and variations of the process 600 in FIG. 6 of an MMU circuit 302 translating a VA 400 to a PA can be performed. For example, in response to an MMU TLB miss (e.g., block 604 in FIG. 6), the MMU circuit 302 may be configured to read the VA in the VA tag field 514 in the in-memory TLB entry 326(0)(0)-324(I)(B) of the accessed in-memory TLB 324(0)-324(I). If the lock indicator 512 in the in-memory TLB entry 326(0)(0)-324(I)(B) indicates a locked state, this means another process is using the same in-memory TLB entry 326(0)(0)-324(I)(B), and this is considered an in-memory TLB miss to perform page table 402 walk (e.g., blocks 612, 614 in FIG. 6). If however, the lock indicator 512 in the in-memory TLB entry 326(0)(0)-324(I)(B) indicates an unlocked state, the MMU circuit 302 can set the lock indicator 512 to a locked state. For example, a compare-and-swap (CAS) instruction can be performed on the VA tag field 514 in the accessed in-memory TLB entry 326(0)(0)-324(I)(B) to set its lock indicator 512 to a locked state. If the CAS instruction fails, this is considered an in-memory TLB miss to perform page table 402 walk (e.g., blocks 612, 614 in FIG. 6).

The MMU circuit 302 can then check the VA in the VA tag field 514 of the locked state accessed in-memory TLB entry 326(0)(0)-324(I)(B) (e.g., in block 608 in FIG. 6) to determine if the VA in the VA tag field 514 matches the VA 400 of the memory access request. If it does not match (e.g., the NO path from block 608 in FIG. 6), this is considered an in-memory TLB miss going to block 612 to perform page table 402 walk (e.g., blocks 612, 614 in FIG. 6). The lock indicator 512 of the accessed in-memory TLB entry 326(0)(0)-324(I)(B) is set to an unlocked state. If however, the VA in the VA tag field 514 of the locked state accessed in-memory TLB entry 326(0)(0)-324(I)(B) matches the VA 400 of the memory access request (e.g., the YES path from block 608 in FIG. 6), the MMU circuit 302 can check the generation number in the generation number field 516 in the in-memory TLB entry 326(0)(0)-324(I)(B) to determine if the generation number is stale. As will be discussed in more detail below, one way to invalidate a stale in-memory TLB entry 326(0)(0)-324(I)(B), such as if a VA-to-PA mapping is changed in the operating system, is to update the generation number in the generation number field 516 of the in-memory TLB entries 326(0)(0)-326(I)(B) to be invalidated such that their generation numbers are not current. A stale in-memory TLB entry 326(0)(0)-326(I)(B) is treated as an in-memory TLB miss. However, if both the VA in the VA tag field 514 of the locked state accessed in-memory TLB entry 326(0)(0)-326(I)(B) in block 608 matches the VA 400 of the memory access request, and the generation number in the generation number field 516 of the accessed in-memory TLB entry 326(0)(0)-326(I)(B) is not stale, the in-memory TLB entry 326(0)(0)-326(I)(B) can be read and used to translate the VA 400 to a PA from the level 2 page table 404(2) which is then used as a starting PA to walk the page table 304 (e.g., block 610 in FIG. 6). The PA is also written back into an MMU TLB entry 318(0)-318(T) in the MMU TLB 306, and the process ends (e.g., block 616 in FIG. 6).

If an MMU TLB miss and in-memory TLB miss occur (e.g., the NO paths from blocks 604 and 608 in FIG. 6), the page table walker circuit 309 walks the page table 402 as previously discussed (e.g., blocks 612, 614 in FIG. 6). If a page table entry 408 found on the page table 402 for the VA 400 does not need to be cached in the in-memory TLB entry 326(0)(0)-326(I)(B), the process ends (e.g., block 616 in FIG. 6). Otherwise, the lock indicator 512 in the in-memory TLB entry 326(0)(0)-326(I)(B) is set unless already in a locked state. If not already in a locked state, the VA in the VA tag field 514 of the available in-memory TLB entry 326(0)(0)-326(I)(B) is set to the new VA value from the instruction being executed that includes a memory access found from the walk of the page table 402 and the lock indicator 512 is set to a locked state by performing a CAS instruction on the VA tag field 514. If the CAS instruction fails, the process ends (e.g., block 616 in FIG. 6). Otherwise, the current generation number is written into the generation number field 516 of the in-memory TLB entry 326(0)(0)-326(I)(B) and the page table entry 408 found from the walk of the page table 402 is written into the in-memory TLB entry 326(0)(0)-326(I)(B). The lock indicator 512 is then reset to an unlocked state. Memory barriers may be required in these steps to make sure that updates are seen in the correct sequence.

If the lock indicator 512 in the in-memory TLB entry 326(0)(0)-326(I)(B) indicates a locked state, this means another process is editing the same in-memory TLB entry 326(0)(0)-326(I)(B), and this is considered an in-memory TLB miss to perform page table 402 walk (e.g., blocks 612, 614 in FIG. 6). The process ends (block 616) since at this point, the page table walk of the page table 304 has already been completed.

Other organizations of page tables can be employed as the page table 304 in the MMU circuit 302 in FIG. 3. For example, FIG. 7A illustrates another example of a multiple level page table 700 that can be included as the page table 304 in the MMU circuit 302 in FIG. 3 to translate the VA 400 to point to a 2 MB physical memory page. For example, 3 levels of level page tables 702(3)-702(1) are provided. The following caching scheme can be employed. Page table entries 704(1)(0)-704(1)(511) in the level 1 page table 702(1) can be leaf page table entries that always get cached in the MMU TLB 306. The page table entries 704(2)(0)-704(2)(511) in the level 2 page table 702(2) are cached in the in-memory TLB 324(0)-324(I). The page table entries 704(3)(0)-704(3)(511) in the level 3 page table 702(3) are above the level of the page table entries cached in the in-memory TLB entries 326(0)(0)-326(I)(B) in the in-memory TLB 324(0)-324(I), and thus page table entries 704(3)(0)-704(3)(511) are not cached.

FIG. 7B illustrates another example of a multiple level page table 705 that can be included as the page table 304 in the MMU circuit 302 in FIG. 3 to translate the VA 400 to point to a 1 GB physical memory page. For example, two (2) levels of level page tables 706(3)-706(2) are provided. The following caching scheme can be employed. The leaf page table entries 708(2)(0)-708(2)(511) in the level 2 page table 706(2) always get cached in the MMU TLB 306. The leaf page table entries 708(2)(0)-708(2)(511) in the level 2 page table 706(2) are cached in the in-memory TLB 324(0)-324

(I). The page table entries 708(3)(0)-708(3)(511) in the level 3 page table 706(3) are above the level of the page table entries cached in the in-memory TLB entries 326(0)(0)-326(I)(B) in the in-memory TLB 324(0)-324(I), and thus page table entries 708(3)(0)-708(3)(511) are not cached.

If a page table levels to cache field 506 in the in-memory TLB register 500 in FIG. 5 specifies that more than one page level should be cached in the identified in-memory TLB 324(0)-324(I), the in-memory TLB 324(0)-324(I) can be split or partitioned into sections in the system memory 208 in the processor-based system 200 in FIG. 2 such that the VAs are mapped to the split in-memory TLB entries 326(0)(0)-326(I)(B). When an in-memory TLB 324(0)-324(I) is split into multiple levels, the MMU circuit 302 needs to search in each level of in-memory TLBs 324(0)-324(I) starting from the lowest to the highest or in parallel. This is shown by example in FIG. 8. As shown in FIG. 8, a 512 entry in-memory TLB 324 can be split into respective top and bottom in-memory TLBs 324(T), 324(B) that each have respective 256 in-memory TLB entries 326(0)-326(255), 326(256)-326(511). For example, level 1 page table entries may be cached in the top in-memory TLBs 324(T), and level 2 page table entries may be cached in the bottom in-memory TLB 324(B). On an MMU TLB miss to the MMU TLB 306, the MMU circuit 302 would first search the in-memory TLB entries 326(0)-326(255) in the top in-memory TLBs 324(T) for a matching level 1 page table entry. If that misses, the MMU circuit 302 would then search the in-memory TLB entries 326(256)-326(511) in the bottom in-memory TLBs 324(B) for a matching level 2 page table entry.

It may also be needed or desired to provide a mechanism to invalidate the MMU TLB entries 318(0)-318(T) in the MMU TLB 306 and the in-memory TLB entries 326(0)(0)-326(I)(B) in the in-memory TLBs 324(0)-324(I) when no longer valid so that an incorrect VA to PA translation is not performed. For example, the VA-to-PA mapping may change when an operating system kernel executing in a CPU 210(0)-210(N) in the processor 202 in FIG. 2 performs an operation that changes the VA-to-PA mapping of a VA to a PA in system memory 208. For example, an operating system kernel may perform functions that change VA-to-PA mapping, such as unmap operations, remapping operations, permission changes, protection changes, and other miscellaneous changes. In essence, when an attribute of a VA-to-PA mapping changes, it may be necessary to invalidate the MMU TLB entries 318(0)-318(T) in the MMU TLB 306 and/or the in-memory TLB entries 326(0)(0)-326(I)(B) in the in-memory TLBs 324(0)-324(I). The in-memory TLBs 324(0)-324(I) are an extension of the MMU TLB 306, and as such invalidations of any MMU TLB entries 318(0)-318(T) will also need to be performed on in-memory TLB entries 326(0)(0)-326(I)(B) in the MMU TLB 306.

For example, the MMU circuit 302 in FIG. 3 may receive an invalidation indicator for an execution process and/or from an operating system kernel as an example to request an invalidation of TLB entries. This is an internal invalidation request as the invalidation request is being initiated from a process and/or operating system kernel with the CPU 210(0)-210(N) of the MMU circuit 302. In response to receiving an invalidation indicator for a process, the MMU circuit 302 can be configured to flush one or more in-memory TLB entries 326(0)(0)-326(I)(B) in the in-memory TLB 324(0)-324(I) allocated to the process based on any VA-to-PA remapping.

As another example, take the situation of process executing on an operating system kernel in a CPU 210(0)-210(N) in the processor 202 in FIG. 2. The process has an assigned in-memory TLB 324(0)-324(I) as previously discussed. A pointer to the memory address of the in-memory TLB 324(0)-324(I) in system memory 208 is stored in the in-memory TLB register 500 in FIG. 5A as previously discussed. When a thread of the process is context switched onto a CPU 210(0)-210(N), the memory address of in-memory TLB 324(0)-324(I) in the system memory 208 is loaded into the in-memory TLB register 500 so that the MMU circuit 302 and its page table walker circuit 309 can access the in-memory TLB 324(0)-324(I) for performing VA-to-PA translations in the event of a TLB miss to the MMU TLB 306. Assume for this example, that the operating system kernel unmaps a range of memory addresses from the memory address space addressed by the process. This means that the page table entries in the unmapped address range that are stored in the in-memory TLB entries 326(0)(0)-326(I)(B) in the in-memory TLB 324(0)-324(I) may now be invalid. Several scenarios may be present. For example, if these page table entries affected by the unmapping are cached in the MMU TLB entries 318(0)-318(T) for the process are leaf or non-leaf page table entries, the MMU TLB entries 318(0)-318(T) in the MMU TLB 306 can be flushed without flushing the in-memory TLB entries 326(0)(0)-326(I)(B) in the in-memory TLB 324(0)-324(I). However, if these page table entry affected by the unmapping are cached in the in-memory TLB entries 326(0)(0)-326(I)(B) for the process, these page tables entries in the in-memory TLB entries 326(0)(0)-326(I)(B) in the in-memory TLB 324(0)-324(I) are flushed to be invalidated. Invalidation could involve the process of simply writing '0's in the page table entry in-memory TLB entries 326(0)(0)-326(I)(B) to be invalidated. In addition, the VA tag field 514 in an in-memory TLB entry 326(0)(0)-326(I)(B) could be written with 0's as a way to invalidate a page table entry in an in-memory TLB entry 326(0)(0)-326(I)(B). If the unmapped page table entry is at a level above the level page tables of page table entries cached in the in-memory TLB 324(0)-324(I) for the process, this means there could be page table entries that are cached from a lower table circuit levels in the in-memory TLB 324(0)-324(I) that are covered by the affected page table entry. In this case, all these page table entries in the in-memory TLB 324(0)-324(I) are invalidated. As one option, an operating system kernel could perform the invalidation by writing to the page table entries in-memory TLB entries 326(0)(0)-326(I)(B) in the in-memory TLB 324(0)-324(I) directly without the MMU circuit 302 performing this task. As another option, an operating system kernel could schedule a task for the MMU circuit 302 to perform the invalidations. The operating system kernel could invalidate an entire in-memory TLB 324(0)-324(I) for a process, for example, by erasing or zeroing out the memory address in the memory address field in the process structure. The operating system kernel can then erase or zero out the memory address in the memory address field 502 in the in-memory TLB register 500 in the current CPU 210(0)-210(N) running the process. The operating system kernel can issue a cross call command to zero out the in-memory TLB register on other CPUs 210(0)-210(N) where threads of the same process are running. The scheduled task could also invalidate an entire in-memory TLB 324(0)-324(I) for a process by erasing or zeroing out for example, the memory address in the memory address field 502 in the in-memory TLB register 500. As for running threads, the operating system kernel could issue a cross call command to the other CPUs 210(0)-210(N) to cause these other CPUs 210(0)-210(N) to erase the memory address in the memory address field 502 in the in-memory TLB register 500 in each CPU

210(0)-210(N) pointing to the in-memory TLB 324(0)-324(I) corresponding to the process that has remapped address space. Once the operating system kernel has taken actions to ensure that the in-memory TLB 324(0)-324(I) to be invalidated is not being used, the operating system kernel can schedule the invalidation in-memory TLB 324(0)-324(I) by a background task if desired.

As an example, one process that can be performed by an operating system kernel to internally invalidate an in-memory TLB entries 326(0)(0)-326(I)(B) in the in-memory TLB 324(0)-324(I) is as follows. A first step could be to invalidate a page table entry in the page table 304. A next step could be to invalidate an in-memory TLB entries 326(0)(0)-326(I)(B) of an in-memory TLB 324(0)-324(I) to be invalidated so that the invalidation is globally visible in the processor 202. This prevents future walks from loading the page table entry in in-memory TLB entry 326(0)(0)-326(I)(B) that is invalidated from being loaded for use. The VA tag field 514 in the page table entry of the in-memory TLB entry 326(0)(0)-326(I)(B) to be invalidated is read and the lock indicator 512 read to determine if in-memory TLB entry 326(0)(0)-326(I)(B) is being accessed by another MMU or process. Once the lock indicator 512 is in an unlocked state, the lock indicator 512 is set to the locked state using a CAS instruction. The page table entry in the page table entry cached field 510 is invalidated. The VA in the VA tag field 514 can also be invalidated, such as by storing all 0's in the VA tag field 514. The lock indicator 512 is then reset to an unlocked state.

It may also be necessary to perform a mechanism to externally invalidate the MMU TLB entries 318(0)-318(T) in the MMU TLB 306 and the in-memory TLB entries 326(0)(0)-326(I)(B) in the in-memory TLBs 324(0)-324(I) when no longer valid so that an incorrect VA-to-PA translation is not performed. For example, a host hypervisor executing in the processor 202 in FIG. 2 may choose to trap guest memory accesses. It can do this by removing access permissions in the host page table that translates guest process PAs to host process PAs. In this situation, all of the guest page table entries in the MMU TLB entries 318(0)-318(T) in the MMU TLB 306 and in-memory TLB entries 326(0)(0)-326(I)(B) in the in-memory TLBs 324(0)-324(I) caching page entries for the host page table may need to be invalidated. However, there could be a number of in-memory TLBs 324(0)-324(I) within the guest processes and the guest operating system. An external invalidation mechanism can be performed by use of a generation number as previous discussed. For example, the host hypervisor could maintain a set of generation numbers, one for each guest operating system. As previously discussed, in-memory TLB entries 326(0)(0)-326(I)(B) has a generation number field 516. Thus, when the MMU circuit 302 caches a page table entry in an in-memory TLB entry 326(0)(0)-326(I)(B) in an in-memory TLBs 324(0)-324(I), a copy of the current guest generation number is stored in the generation number field 516 of the cached in-memory TLB entry 326(0)(0)-326(I)(B). Thus, when the MMU circuit 302 matches an in-memory TLB entry 326(0)(0)-326(I)(B) in an in-memory TLB 324(0)-324(I) for a given VA 400 to be translated, the generation number stored in the generation number field 516 of the matching in-memory TLB entry 326(0)(0)-326(I)(B) is checked to see if it is current. If not current, the page table entry in the matching in-memory TLB entry 326(0)(0)-326(I)(B) is not used by the MMU circuit 302 effectively meaning it is invalid. When the host hypervisor desires to invalidate all in-memory TLB entries 326(0)(0)-326(I)(B) in an in-memory TLBs 324(0)-324(I) for a guest operating system, the host hypervisor can simply increment the generation number stored in the generation number field 516 for all the in-memory TLB entries 326(0)(0)-326(I)(B) to be invalidated.

It may also be desired to be able to change the size of an in-memory TLBs 324(0)-324(I) dynamically to improve performance of VA-to-PA translation for a particular process. For example, it may be desired to provide a mechanism to allow an operating system kernel to dynamically change the size of an in-memory TLBs 324(0)-324(I) for a process if the memory access requests for the process do not achieve the desired access time performance. However, the same in-memory TLBs 324(0)-324(I) may be accessed by multiple threads of the same process at the same time. Thus, as an example, the operating system kernel may be configured to resize an in-memory TLB 324(0)-324(I) by first invalidating (e.g., zeroing out) the memory address in the memory address field 502 in the process and on the current CPU 210(0)-210(N) for an in-memory TLBs 324(0)-324(I) to be resized. For running threads, the operating system kernel can be configured to send a cross call command to the other CPUs 210(0)-210(N) that would cause the other CPUs 210(0)-210(N) to invalidate the memory address field 502 in an in-memory TLB register 500 in a process for the in-memory TLBs 324(0)-324(I) so that the MMU circuit 302 in the CPUs 210(0)-210(N) are effectively prevented from using the in-memory TLBs 324(0)-324(I) to be resized for VA-to-PA translations. Now that the operating system kernel can be sure that the in-memory TLB 324(0)-324(I) for a process to be resized will not be used by a thread of that process, the operating system kernel can allocate a new in-memory TLB 324(0)-324(I) for the process in the system memory 208 and initiate the in-memory TLB entries 326(0)(0)-324(I)(B) and setup the in-memory TLB register 500 corresponding to the resized in-memory TLB 324(0)-324(I) to allow the resized in-memory TLB 324(0)-324(I) to be used by MMU circuit 302 for VA-to-PA translations. A malicious guest may also be able to forge in-memory TLB entries 326(0)(0)-324(I)(B) in an in-memory TLBs 324(0)-324(I). Under special circumstances when a host hypervisor needs the guest process to walk a full page table, the host hypervisor could disable the use of in-memory TLBs 324(0)-324(I) corresponding to the guest process. During later normal operation, the in-memory TLBs 324(0)-324(I) can be re-enabled. If the forgery is done under normal operation of the guest host, it can only affect the guest process and not other guest processes or the host process.

FIG. 9 is a block diagram of an exemplary processor-based system 900 that includes a processor 902 that can include a memory management system 904 with dedicated mTLBs 906 for augmenting an MM UTLB for translating VAs to PA, including but not limited to the memory management system 300 in FIG. 3 and its exemplary components in FIGS. 4A-5B, and 7A-8. The processor-based system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 900 includes the processor 902. The processor 902 represents one or more general-purpose processing circuits, such as a microprocessor, central processing unit, or the like. More particularly, the processor 902 may be an EDGE instruction set microprocessor, or other processor implementing an instruction set that supports explicit consumer naming for communicating produced values resulting from execution of producer instructions. The processor 902 is configured to execute processing logic in instructions for performing the operations and steps discussed herein. In this example, the processor 902 includes an instruction cache 908 for temporary, fast access memory storage of instructions accessible by the memory management system 904. Fetched or prefetched instructions from a memory, such as from a system memory 910 over a system bus 912, are stored in the instruction cache 908. The memory management system 904 is configured to process instructions fetched into the instruction cache 908 and process the instructions for execution.

The processor 902 and the system memory 910 are coupled to the system bus 912 and can intercouple peripheral devices included in the processor-based system 900. As is well known, the processor 902 communicates with these other devices by exchanging address, control, and data information over the system bus 912. For example, the processor 902 can communicate bus transaction requests to a memory controller 914 in the system memory 910 as an example of a slave device. Although not illustrated in FIG. 9, multiple system buses 912 could be provided, wherein each system bus constitutes a different fabric. In this example, the memory controller 914 is configured to provide memory access requests to a memory array 916 in the system memory 910. The memory array 916 is comprised of an array of storage bit cells for storing data. The system memory 910 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 912. As illustrated in FIG. 9, these devices can include the system memory 910, an external cache memory 917 as part of a cache memory system 918 that may include lower-level cache memories all of which are accessible by the processor 902, one or more input device(s) 918, one or more output device(s) 920, a modem 922, and one or more display controllers 924, as examples. The input device(s) 918 can include any type of input device, including but not limited to input keys, switches, voice processors, etc. The output device(s) 920 can include any type of output device, including but not limited to audio, video, other visual indicators, etc. The modem 922 can be any device configured to allow exchange of data to and from a network 926. The network 926 can be any type of network, including but not limited to a wired or wireless network, a private or public network, a local area network (LAN), a wireless local area network (WLAN), a wide area network (WAN), a BLUETOOTH™ network, and the Internet. The modem 922 can be configured to support any type of communications protocol desired. The processor 902 may also be configured to access the display controller(s) 924 over the system bus 912 to control information sent to one or more displays 928. The display(s) 928 can include any type of display, including but not limited to a cathode ray tube (CRT), a liquid crystal display (LCD), a plasma display, etc.

The processor-based system 900 in FIG. 9 may include a set of instructions 930 to be executed by the processor 902 for any application desired according to the instructions. The instructions 930 may be stored in the system memory 910, processor 902, and/or instruction cache 908 as examples of a non-transitory computer-readable medium 932. The instructions 930 may also reside, completely or at least partially, within the system memory 910 and/or within the processor 902 during their execution. The instructions 930 may further be transmitted or received over the network 926 via the modem 922, such that the network 926 includes the computer-readable medium 932.

While the computer-readable medium 932 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A memory management system in a central processing unit (CPU) in a processor of a processor-based system, comprising:

a page table in a system memory of the processor-based system, the page table comprising a plurality of level page tables each comprising a plurality of page table entries that are addressable by a different level index of a virtual address (VA) and the plurality of page table entries configured to store a physical address (PA) associated with the VA;

a memory management unit (MMU) translation lookaside buffer (TLB) comprising a plurality of MMU TLB entries each configured to store a cached page table entry of the plurality of page table entries;

an in-memory TLB in the system memory, the in-memory TLB comprising a plurality of in-memory TLB entries each configured to store a cached page table entry of the plurality of page table entries;

a page table walker circuit configured to access the plurality of page table entries in the plurality of level page tables in the page table based on the VA;

and an MMU circuit configured to:
  receive a memory access request comprising a request VA based on a computer software instruction executed for a process in the CPU;
  determine if an MMU TLB entry, among the plurality of MMU TLB entries in the MMU TLB, contains a page table entry comprising a PA corresponding to the request VA;
  and in response to determining the MMU TLB does not contain the MMU TLB entry containing the page table entry comprising the PA corresponding to the request VA:
    determine if a VA stored in a first in-memory TLB entry, among the plurality of in-memory TLB entries in the in-memory TLB allocated to the process in the CPU, matches the request VA;
    in response to determining the VA stored in the first in-memory TLB entry matches the request VA, translate the request VA to a PA based on the first in-memory TLB entry;
    and in response to determining the VA stored in the first in-memory TLB entry does not match the request VA, cause the page table walker circuit to:
      access the plurality of level page tables in the page table based on the request VA;
      translate the request VA to a first PA contained in a first page table entry in the plurality of level page tables corresponding to the request VA;
      write the first page table entry, in at least one level page table of the plurality of level page tables in the page table corresponding to the request VA, to a first MMU TLB entry in the MMU TLB;

and in response to writing the first page table entry to the first MMU TLB entry in the MMU TLB:

in response to the first page table entry in the at least one level page table being in a highest level page table of the plurality of level page tables:

not write the first page table entry to an in-memory TLB entry in the in-memory TLB.

2. The memory management system of claim 1, wherein the MMU circuit is further configured to, in response to determining the VA stored in the first in-memory TLB entry matches the request VA:

write the first in-memory TLB entry to an MMU TLB entry in the MMU TLB.

3. The memory management system of claim 1, wherein the MMU circuit is further configured to, in response to determining the MMU TLB contains the MMU TLB entry containing the page table entry comprising the PA corresponding to the request VA:

translate the request VA to the PA contained in the page table entry in the MMU TLB entry.

4. The memory management system of claim 3, wherein the MMU circuit is configured to, in response to determining the MMU TLB contains the MMU TLB entry containing the page table entry that is a leaf page table entry:

translate the request VA to the PA contained in the page table entry in the MMU TLB entry.

5. The memory management system of claim 3, wherein:

the MMU circuit is configured to, in response to determining the MMU TLB contains the MMU TLB entry containing the page table entry that is a non-leaf page table entry:

cause the page table walker circuit to:

access a page table entry in a next level page table among the plurality of level page tables in the page table based on the non-leaf page table entry in the MMU TLB entry;

and translate the request VA to a PA contained in the page table entry in the next level page table.

6. The memory management system of claim 1, wherein the MMU circuit is further configured to, in response to writing a second page table entry stored in one of the plurality of level page tables in the page table corresponding to the request VA, to a second in-memory TLB entry in the in-memory TLB:

write the second page table entry to a second MMU TLB entry in the MMU TLB.

7. The memory management system of claim 1, wherein the MMU circuit is further configured to, in response to determining the VA stored in the first in-memory TLB entry does not match the request VA:

write a third page table entry stored in one of the plurality of level page tables in the page table corresponding to the request VA, to an in-memory TLB entry in the in-memory TLB.

8. The memory management system of claim 1, wherein:

each of the plurality of in-memory TLB entries in the in-memory TLB further comprises a lock indicator field configured to store a lock indicator indicating a lock state;

the MMU circuit is further configured to, in response to determining the MMU TLB does not contain the MMU TLB entry containing the page table entry comprising the PA corresponding to the request VA:

determine if the lock indicator, in the lock field in the first in-memory TLB entry, indicates the locked state;

and in response to the lock indicator, in the lock field in the first in-memory TLB entry, indicating the locked state, not translating the request VA to the PA based on the first in-memory TLB entry.

9. The memory management system of claim 8, wherein the MMU circuit is further configured to:

in response to the lock indicator, in the lock field in the first in-memory TLB entry, indicating an unlocked state, not translating the request VA to the PA based on the first in-memory TLB entry:

set the lock indicator, in the lock field in the first in-memory TLB entry, to the locked state;

determine if the VA stored in the first in-memory TLB entry matches the request VA;

and in response to determining the VA stored in the first in-memory TLB entry matches the request VA:

translate the request VA to the PA based on the first in-memory TLB entry;

and set the lock indicator, in the lock field in the first in-memory TLB entry, to the unlocked state.

10. The memory management system of claim 1, wherein the MMU circuit is further configured to:

receive an invalidation indicator for the process; and in response to receiving the invalidation indicator for the process, flush an in-memory TLB entry in the in-memory TLB allocated to the process in response to the in-memory TLB entry containing a page table entry.

11. The memory management system of claim 1 wherein:

each of the plurality of in-memory TLB entries in the in-memory TLB further comprises a generation number field configured to store a generation number;

and the MMU circuit is configured to, in response to determining the VA stored in the first in memory TLB does not match the request VA:

write, to a second in-memory TLB entry in the in-memory TLB, a second page table entry and a current generation number.

12. The memory management system of claim 11, wherein the MMU circuit is further configured to, in response to determining the MMU TLB not containing the MMU TLB entry containing the page table entry comprising the PA corresponding to the request VA:

determine if a generation number, stored in the generation number field in the first in-memory TLB entry in the in-memory TLB allocated to the process matches the current generation number;

and in response to determining the generation number stored in the generation number field in the first in-memory TLB entry, does not match the current generation number, the MMU circuit is further configured to cause the page table walker circuit to:

access the plurality of level page tables in the page table based on the request VA;

and translate the request VA to the first PA contained in the first page table entry.

13. The memory management system of claim 1, wherein:

the page table comprises:

a leaf level page table comprising a plurality of leaf page table entries addressable by a leaf level of the VA and the plurality of leaf page table entries configured to store a PA associated with the VA;

a first level page table comprising a plurality of first level page table entries addressable by a first level of the VA and each of the plurality of first level page table entries configured to store an address of a leaf page table entry in the leaf level page table;

and a second level page table comprising a plurality of second level page table entries addressable by a second level of the VA and each of the plurality of second level page table entries configured to store an address of a first level page table entry in the first level page table;

the in-memory TLB comprises the plurality of in-memory TLB entries each configured to store a second level page table entry from the second level page table;

and the MMU TLB comprises the plurality of MMU TLB entries each configured to store a first level page table entry from the first level page table.

14. The memory management system of claim 1, wherein:

the page table comprises:

a leaf level page table comprising a plurality of leaf page table entries addressable by a leaf level of the VA and the plurality of leaf page table entries configured to store a PA associated with the VA;

and a first level page table comprising a plurality of first level page table entries addressable by a first level of the VA and each of the plurality of first level page table entries configured to store an address of a leaf page table entry in the leaf level page table;

and the in-memory TLB comprises the plurality of in-memory TLB entries each configured to store a first level page table entry from the first level page table;

and the MMU TLB comprises the plurality of MMU TLB entries each configured to store a first level page table entry from the first level page table.

15. The memory management system of claim 1, wherein:

the page table comprises:

a leaf level page table comprising a plurality of leaf page table entries addressable by a leaf level of the VA and the plurality of leaf page table entries configured to store a PA associated with the VA;

and a first level page table comprising a plurality of first level page table entries addressable by a first level of the VA and each of the plurality of first level page table entries configured to store an address of a leaf page table entry in the leaf level page table;

and the in-memory TLB comprises:

a first in-memory TLB comprising a first plurality of in-memory TLB entries each configured to store a first level page table entry from the first level page table;

and a second in-memory TLB comprising a second plurality of in-memory TLB entries each configured to store a second level page table entry from the second level page table.

16. The memory management system of claim 1, further comprising an in-memory TLB register configured to store a memory address pointing to the in-memory TLB in the system memory in the processor-based system, the MMU circuit further configured to:

access the first in-memory TLB entry in the in-memory TLB allocated to the process based on the memory address, corresponding to the process, in the in-memory TLB address register corresponding to the request VA.

17. The memory management system of claim 1 comprising the system memory comprising a plurality of in-memory TLBs each allocated to a process.

18. A method of translating a virtual address (VA) to a physical address (PA) in a central processing unit (CPU) in a processor of a processor-based system, comprising:

receiving a memory access request comprising a request VA based on a computer software instruction executed for a process in the CPU;

determining a memory management unit (MMU) translation lookaside buffer (TLB) entry, in an MMU TLB comprising a plurality of MMU TLB entries each configured to store a cached page table entry of a plurality of page table entries, does not contain a page table entry comprising a PA corresponding to the request VA, wherein the page table entry is contained in a page table comprising a plurality of level page tables each comprising a plurality of page table entries that are addressable by a VA and the plurality of page table entries configured to store a PA associated with the VA;

and in response to determining the MMU TLB does not contain the MMU TLB entry containing the page table entry comprising the PA corresponding to the request VA:

determining a VA stored in a first in-memory TLB entry, among a plurality of in-memory TLB entries in the in-memory TLB in the system memory of the processor-based system that is allocated to the process in the system memory in the processor-based system, does not match the request VA;

in response to determining the VA stored in the first in-memory TLB entry matches the request VA, translating the request VA to a PA based on the first in-memory TLB entry;

and in response to determining the VA stored in the first in-memory TLB entry does not match the request VA, cause a page table walker circuit to:

access at least one level page table in the plurality of level page tables based on the request VA;

translate the request VA to a first PA contained in a first page table entry in the plurality of level page tables corresponding to the request VA;

write the first page table entry, in the plurality of level page tables in the page table corresponding to the request VA, to a first MMU TLB entry in the MMU TLB;

and in response to writing the first page table entry to the first MMU TLB entry in the MMU TLB:

in response to the first page table entry in the plurality of level page tables being in a highest level page table of the plurality of level page tables:

not write the first page table entry to an in-memory TLB entry in the in-memory TLB.

19. The method of claim 18, further comprising, in response to determining the VA stored in the first in-memory TLB entry matches the request VA:

writing the first in-memory TLB entry to an MMU TLB entry in the MMU TLB.

20. The method of claim 18, further comprising, in response to determining the MMU TLB contains the MMU TLB entry containing the page table entry comprising the PA corresponding to the request VA:

translating the request VA to the PA contained in the page table entry in the MMU TLB entry.

21. A processor-based system, comprising:

a system memory;

a processor comprising one or more central processing units (CPUs) each configured to execute computer instructions in an operating system software program and one or more processes;
a memory management system, in a CPU of the one or more CPUs, comprising:
a page table in the system memory, the page table comprising a plurality of level page tables each comprising a plurality of page table entries that are addressable by a different level index of a virtual address (VA) and the plurality of page table entries configured to store a physical address (PA) associated with the VA;
a memory management unit (MMU) translation lookaside buffer (TLB) comprising a plurality of MMU TLB entries each configured to store a cached page table entry of the plurality of page table entries;
an in-memory TLB in the system memory, the in-memory TLB comprising a plurality of in-memory TLB entries each configured to store a cached page table entry of the plurality of page table entries;
a page table walker circuit configured to access a page table entry in the plurality of level page tables in the page table based on the VA;
and an MMU circuit configured to:
receive a memory access request comprising a request VA based on a computer software instruction executed for a process among the one or more processes in a CPU among the one or more CPUs;
determine if an MMU TLB entry in the MMU TLB contains a page table entry comprising a PA corresponding to the request VA;
in response to determining the MMU TLB does not contain the MMU TLB entry containing the page table entry comprising the PA corresponding to the request VA:
determine if a VA stored in a first in-memory TLB entry, in the in-memory TLB allocated to the process in the system memory in the processor-based system, matches the request VA;
and in response to determining the VA stored in the first in-memory TLB entry matches the request VA, translate the request VA to a PA based on the first in-memory TLB entry;
and in response to determining the VA stored in the first in-memory TLB entry does not match the request VA, cause the page table walker circuit to:
access the plurality of level page tables in the page table based on the request VA;
translate the request VA to a first PA contained in a first page table entry in one level page table of the plurality of level page tables corresponding to the request VA;
write the first page table entry, in the one level page table of the plurality of level page tables in the page table corresponding to the request VA, to a first MMU TLB entry in the MMU TLB;
and in response to writing the first page table entry to the first MMU TLB entry in the MMU TLB:
in response to the first page table entry in the one level page table being in a highest level page table of the plurality of level page tables: not write the first page table entry to an in-memory TLB entry in the in-memory TLB.

22. The processor-based system of claim 21, wherein the one or more CPUs each configured to execute the computer instructions in the operating system software to:
determine that a VA-to-PA mapping, comprising one or more VAs mapped to one or more PAs, to the system memory has changed for an executed process;
in response to determining that the VA-to-PA mapping to the system memory for the executed process has changed:
determine if one or more of the page table entries, corresponding to the VAs in the VA-to-PA mapping for the executed process, are comprised of only leaf page table entries;
in response to determining the one or more of the page table entries, corresponding to the VAs in the VA-to-PA mapping for the executed process, are not only comprised of leaf page table entries:
determine if the one or more of the page table entries, corresponding to the VAs in the VA-to-PA mapping for the executed process, are contained in one or more entries of the in-memory TLB entries corresponding to the VAs in the VA-to-PA mapping for the executed process;
and in response to determining the one or more of the page table entries, corresponding to the VA-to-PA mapping for the executed process, are contained in the one or more entries of the in-memory TLB entries corresponding to the VAs in the VA-to-PA for the executed process:
flush the one or more entries of the in-memory TLB entries corresponding to the VAs in the VA-to-PA mapping for the executed process.

23. The processor-based system of claim 22, wherein the one or more CPUs each further configured to execute the computer instructions in the operating system software program to, in response to determining the one or more of the page table entries, corresponding to the VAs in the VA-to-PA mapping for the executed process, are only comprised of leaf page table entries:
flush one or more entries of the MMU TLB entries, corresponding to the VAs in the VA-to-PA mapping, in the MMU TLB.

24. The processor-based system of claim 22, wherein the one or more CPUs each further configured to execute the computer instructions in the operating system software program to, in response to determining the one or more of the page table entries, corresponding to the VAs in the VA-to-PA mapping for the executed process, are not only comprised of leaf page table entries:
determine if the one or more of the page table entries, corresponding to the VAs in the VA-to-PA mapping for the executed process, are in a level page table above a page level of the in-memory TLB;
in response to determining the one or more of the page table entries, corresponding to the VAs in the VA-to-PA mapping for the executed process, are in the level page table above the page level of the in-memory TLB:
flush the one or more entries of the in-memory TLB entries corresponding to the VAs in the VA-to-PA mapping for the executed process;
flush one or more entries of the MMU TLB entries, corresponding to the VAs in the VA-to-PA mapping, in the MMU TLB;
and flush the one or more of the page table entries, corresponding to the VAs in the VA-to-PA mapping, in the page table.

25. The processor-based system of claim 24, further comprising a plurality of in-memory TLB address registers each corresponding to a respective process of the one or more processes and each configured to store a memory address pointing to a respective in-memory TLB, in the system memory, allocated to the respective process;

wherein:
the MMU circuit is further configured to access the first in-memory TLB entry, in the in-memory TLB allocated to the process, based on an in-memory TLB address in an in-memory TLB address register of the plurality of in-memory TLB address registers;
and the CPU is further configured to, in response to determining the one or more of the page table entries, corresponding to the VAs in the VA-to-PA mapping for the executed process, are in the level page table above the page level of the in-memory TLB:
erase the memory address in one or more of the plurality of in-memory TLB address registers, corresponding to the executed process, in the CPU.

26. The processor-based system of claim 25, wherein the CPU is further configured to, in response to determining the one or more of the page table entries, corresponding to the VAs in the VA-to-PA mapping for the executed process, are in the level page table above the page level of the in-memory TLB:
issue a cross call command to other CPUs among the one or more CPUs to cause the other CPUs to erase the memory address, pointing to the respective in-memory TLB allocated to the executed process, in one or more of the plurality of in-memory TLB address registers, corresponding to the executed process, in the other CPUs.

27. The processor-based system of claim 22, wherein:
each of the plurality of in-memory TLB entries, in the in-memory TLB allocated to the process, further comprises a generation number field configured to store a generation number;
and the MMU circuit is configured to, in response to determining the VA stored in the first in-memory TLB entry does not match the request VA:
write, to a second in-memory TLB entry, a second page table entry and a current generation number;
and in response to determining the MMU TLB not containing the MMU TLB entry containing the page table entry comprising the PA corresponding to the request VA:
determine if a generation number, stored in the generation number field in the first in-memory TLB entry in the in-memory TLB allocated to the process, matches the current generation number;
and in response to determining the generation number, stored in the generation number field in the first in-memory TLB entry, does not match the current generation number, the MMU circuit is further configured to cause the page table walker circuit to:
access the plurality of level page tables in the page table based on the request VA;
and translate the request VA to the first PA contained in the first page table entry;
and the CPU further configured to, in response to determining the one or more of the page table entries, corresponding to the VA-to-PA mapping for the executed process, are contained in the one or more entries of the in-memory TLB entries corresponding to the VAs in the VA-to-PA for the executed process:
change the current generation number.

28. The processor-based system of claim 22, further comprising a plurality of in-memory TLB address registers each corresponding to a respective process of the one or more processes and each configured to store a memory address pointing to a respective in-memory TLB, in the system memory, allocated to the respective process;
wherein the CPU is further configured to dynamically resize an allocation of a target in-memory TLB in the system memory, by being configured to:
erase the memory address, pointing to the target in-memory TLB in one or more of the plurality of in-memory TLB address registers corresponding to the target in-memory TLB to be resized;
and issue a cross call command to other CPUs among the one or more CPUs to cause the other CPUs to erase the memory address, pointing to the target in-memory TLB in one or more of the plurality of in-memory TLB address registers corresponding to the target in-memory TLB to be resized.

* * * * *